US010911676B2

(12) United States Patent
Kitagawa et al.

(10) Patent No.: US 10,911,676 B2
(45) Date of Patent: Feb. 2, 2021

(54) MEMORY CARD AND MOVING IMAGE REPRODUCTION DEVICE

(71) Applicant: FUJIFILM Corporation, Tokyo (JP)

(72) Inventors: Junya Kitagawa, Saitama (JP); Tomonori Masuda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/406,975

(22) Filed: May 8, 2019

(65) Prior Publication Data

US 2019/0268540 A1 Aug. 29, 2019

Related U.S. Application Data

(63) Continuation of application No. PCT/JP2017/032721, filed on Sep. 11, 2017.

(30) Foreign Application Priority Data

Nov. 16, 2016 (JP) ................................. 2016-223154

(51) Int. Cl.
*H04N 5/232* (2006.01)
*H04N 5/907* (2006.01)
(Continued)

(52) U.S. Cl.
CPC ......... *H04N 5/23267* (2013.01); *H04N 5/225* (2013.01); *H04N 5/232* (2013.01);
(Continued)

(58) Field of Classification Search
CPC .......... H04N 5/91; H04N 5/225; H04N 5/232; H04N 5/772; H04N 5/907; H04N 5/23258;
(Continued)

(56) References Cited

U.S. PATENT DOCUMENTS

2012/0147148 A1* 6/2012 Kusaka .............. H04N 5/23258 348/49
2013/0073253 A1* 3/2013 Handa ................ G01R 33/0206 702/152

FOREIGN PATENT DOCUMENTS

JP 2007-142525 A 6/2007
JP 2007142525 A * 6/2007 ............ H04N 5/225
(Continued)

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2017/032721, dated May 31, 2019, with English translation.
(Continued)

*Primary Examiner* — Thai Q Tran
*Assistant Examiner* — Nienru Yang
(74) *Attorney, Agent, or Firm* — Birch, Stewart, Kolasch & Birch, LLP

(57) ABSTRACT

The memory card includes: a gyro sensor that detects each of angular velocities in respective directions of axial rotation about three orthogonal axes; a first recording unit that records the moving image captured by the electronic device; a second recording unit that records each of first, second, and third sensor outputs indicating the angular velocities in the directions of axial rotation about the three orthogonal axes, which are detected by the gyro sensor, in association with the moving image to be recorded in the first recording unit; a determination unit that determines a direction of insertion of the memory card, which is mounted on the electronic device, into the electronic device; and a third recording unit that records information indicating the direction of insertion determined by the determination unit.

20 Claims, 16 Drawing Sheets

(51) Int. Cl.
*H04N 9/80* (2006.01)
*H04N 9/87* (2006.01)
*H04N 5/91* (2006.01)
*H04N 5/225* (2006.01)

(52) U.S. Cl.
CPC ......... *H04N 5/23258* (2013.01); *H04N 5/907* (2013.01); *H04N 5/91* (2013.01); *H04N 9/80* (2013.01); *H04N 9/87* (2013.01)

(58) Field of Classification Search
CPC .... H04N 5/23267; H04N 9/80; H04N 9/8042; H04N 9/87
USPC .......................................................... 386/227
See application file for complete search history.

(56) References Cited

FOREIGN PATENT DOCUMENTS

| | | | |
|---|---|---|---|
| JP | 2007-212158 | A | 8/2007 |
| JP | 2013-64695 | A | 4/2013 |

OTHER PUBLICATIONS

International Search Report (Form PCT/ISA/210) for International Application No. PCT/JP2017/032721, dated Oct. 17, 2017, with English translation.
Unknown, "SD Card with Built in Gyrosensor", Gigazine, Aug. 9, 2016, http://gigazine.net/news/20160809-virtualgirnbal-mft2016, 3 pages total.

* cited by examiner

| INSERTION DIRECTION | FIG. 7 | FIG. 8 | FIG. 9 | FIG. 10 | FIG. 11 | |
|---|---|---|---|---|---|---|
| X | x | −x | y | −z | x | ....... |
| Y | y | y | −x | y | −y | |
| Z | z | −z | z | x | −z | |

MEMORY CARD AND MOVING IMAGE REPRODUCTION DEVICE

CROSS-REFERENCE TO RELATED APPLICATIONS

This application is a Continuation of PCT International Application No. PCT/JP2017/032721 filed on Sep. 11, 2017, which claims priority under 35 U.S.C § 119(a) to Japanese Patent Application No. 2016-223154 filed on Nov. 16, 2016. Each of the above application(s) is hereby expressly incorporated by reference, in its entirety, into the present application.

BACKGROUND OF THE INVENTION

1. Field of the Invention

The present invention relates to a memory card and a moving image reproduction device, and more particularly to a memory card capable of recording information about camera shake in a case of recording a moving image and a moving image reproduction device which reproduces the moving image recorded in the memory card.

2. Description of the Related Art

As a camera shake correction method for cameras and smartphones, there is a general method of performing correction by using sensor information of a built-in gyro sensor or an acceleration sensor as information about camera shake or by using information of motion vectors obtained by video analysis. Recently, the following method has been proposed. A gyro sensor and an acceleration sensor are built into an accessory mounted on a hot shoe of a digital camera or a memory card (SD card) mounted on a camera, and sensor information is recorded together with the video and which is able to easily correct blurring of the recorded moving image, and thereafter blurring of the video is corrected through software processing or the like performed by a personal computer on the basis of the sensor information (SD card with built-in gyro sensor, Internet <URL: http: gigazine.net/news/20160809-virtualgimbal-mft2016/>).

JP2007-142525A describes a memory card having a built-in gyro sensor and an imaging apparatus (cellular phone) that detects the tilt of the optical axis using the memory card. According to the sensor information of the gyro sensor built into the memory card, the imaging apparatus detects information about the tilt of the imaging optical axis at the time of capturing an image of a subject (for example, a flower), and uses the tilt information (the direction in which the flower blooms) as a retrieval key for subject information retrieval.

SUMMARY OF THE INVENTION

In a case where a gyro sensor or the like is built into the accessory of the hot shoe of the camera, there is no problem because the position and direction of attachment of the accessory are the same for any type of machine. However, in the case of the SD card, the direction and place of insertion are different depending on the device. Thus, There is a problem that, even in a case where the same blurring occurs in the device, the direction and value of the sensor information obtained from the gyro sensor or the acceleration sensor changes depending on the device (the correction performance is affected).

Therefore, the SD card with the built-in gyro sensor described in SD card with built-in gyro sensor, Internet <URL: http: gigazine.net/news/20160809-virtualgimbal-mft2016/> can be used for devices which are compatible with the SD card on the basis of the direction of insertion of the SD card. However, there is a problem in that it is difficult to use the SD card in common for various devices into which an SD card is inserted in different directions.

In addition, the memory card with the built-in gyro sensor described in JP2007-142525A is not used for correcting blurring of a video and also does not record sensor information. Further, JP2007-142525A does not describe the direction of insertion of the memory card.

The present invention has been made in consideration of the above-mentioned situations, and it is an object of the present invention to provide a memory card which can be applied to various electronic devices having at least an imaging unit for capturing moving images, and a moving image reproduction device.

In order to achieve the above-mentioned object, according to one aspect of the present invention, there is provided a memory card attachable to and detachable from an electronic device having an imaging unit for capturing at least a moving image. The memory card comprises: a gyro sensor that detects each of angular velocities in respective directions of axial rotation about three orthogonal axes; a first recording unit that records the moving image captured by the electronic device; a second recording unit that records each of first, second, and third sensor outputs indicating the angular velocities in the directions of axial rotation about the three orthogonal axes, which are detected by the gyro sensor, in association with the moving image to be recorded in the first recording unit; a determination unit that determines a direction of insertion of the memory card, which is mounted on the electronic device, into the electronic device; and a third recording unit that records information indicating the direction of insertion determined by the determination unit.

According to the aspect of the present invention, the moving image captured by the electronic device is recorded, and each of first, second, and third sensor outputs indicating the angular velocities in the directions of axial rotation about the three orthogonal axes, which are detected by the built-in gyro sensor, is recorded in association with the moving image. Further, the determination unit determines the direction of insertion of the memory card, which is mounted on the electronic device, into the electronic device, and the determination result (information indicating the direction of insertion) is recorded. Thereby, in a case of reproducing the moving image recorded in the memory card, it is possible to correct blurring of the moving image by using the first, second, and third sensor outputs and to reproduce the moving image. In particular, on the basis of the information indicating the direction of insertion, it is possible to detect which direction of the yaw direction, the pitch direction, and the roll direction of the electronic device each of the first, second, and third sensor outputs is the angular velocity in (including positive and negative directions). Thus, it is possible to appropriately correct blurring of the moving image by using the first, second, and third sensor outputs.

According to another aspect of the present invention, there is provided a memory card attachable to and detachable from an electronic device having an imaging unit for capturing at least a moving image. The memory card comprises: a gyro sensor that detects each of angular velocities in respective directions of axial rotation about three orthogonal axes; a first recording unit that records the moving image captured by the electronic device; a second recording unit that records each of first, second, and third sensor outputs indicating the angular velocities in the directions of axial rotation about the three orthogonal axes, which are detected by the gyro sensor, in association with the moving image to be recorded in the first recording unit; and a determination unit that determines a direction of insertion of the memory card, which is mounted on the electronic device, into the electronic device. The second recording unit records each of the first, second, and third sensor outputs in data areas allocated for a yaw direction, a pitch direction, and a roll direction, on the basis of the direction of insertion determined by the determination unit.

According to the aspect of the present invention, the moving image captured by the electronic device is recorded, and each of first, second, and third sensor outputs indicating the angular velocities in the directions of axial rotation about the three orthogonal axes, which are detected by the built-in gyro sensor, is recorded in association with the moving image. In particular, the determination unit determines the direction of insertion of the memory card, which is mounted on the electronic device, into the electronic device, and the first, second, and third sensor outputs of the gyro sensor are respectively recorded in data areas allocated for the yaw direction, the pitch direction, and the roll direction, on the basis of the determination result. Thus, in a case of reproducing the moving image recorded in the memory card, it is possible to appropriately correct blurring of the moving image by using the first, second, and third sensor outputs recorded in the data areas allocated for the yaw direction, the pitch direction, and the roll direction and to reproduce the moving image.

According to still another aspect of the present invention, the memory card further comprises an acceleration sensor that detects each of accelerations in respective axis directions of the three orthogonal axes. It is preferable that the second recording unit records each of the fourth, fifth, and sixth sensor outputs indicating the accelerations in the respective axis directions of the three orthogonal axes, which are detected by the acceleration sensor, in association with the moving image to be recorded in the first recording unit. Thereby, it is also possible to correct blurring of the moving image caused by the accelerations of the electronic device in the right-left direction, the up-down direction, and the front-rear direction. In addition, it can be detected, from the information indicating the direction of insertion of the memory card, which direction of the right-left direction, the up-down direction, and the front-rear direction of the electronic device corresponds to the accelerations of the fourth, fifth, and sixth sensor outputs of the acceleration sensor.

According to still another aspect of the present invention, the memory card further comprises an acceleration sensor that detects each of accelerations in respective axis directions of the three orthogonal axes. It is preferable that the second recording unit records each of fourth, fifth, and sixth sensor outputs indicating the accelerations in the respective axis directions of the three orthogonal axes, which are detected by the acceleration sensor on the basis of the direction of insertion determined by the determination unit, in data areas allocated for a right-left direction, an up-down direction and a front-rear direction of the moving image. Thereby, it is also possible to correct blurring of the moving image caused by the accelerations of the electronic device in the right-left direction, the up-down direction, and the front-rear direction.

In the memory card according to still another aspect of the present invention, it is preferable that the determination unit determines the direction of insertion on the basis of the fourth, fifth, and sixth sensor outputs obtained from the acceleration sensor in a case where the electronic device captures the moving image and the fourth, fifth, and sixth sensor outputs obtained from the acceleration sensor in a case of using a display provided on a rear side of the electronic device.

In a case where the electronic device captures a moving image, the maximum sensor output among the fourth, fifth, and sixth sensor outputs obtained from the acceleration sensor is the acceleration in the direction of gravity. Thus, a relationship between the direction of gravity in the memory card inserted into the electronic device and one axis direction of the three orthogonal axes of the acceleration sensor can be seen. Further, in a case where the display on the rear side of the electronic device is used (for example, in a case of displaying a menu screen on the display and making various settings, or in a case of reproducing a moving image on the display, etc), the display screen is upward. Thus, the minimum sensor output among the fourth, fifth, and sixth sensor outputs obtained from the acceleration sensor at this time is a sensor output corresponding to the acceleration in the horizontal direction in which the acceleration in the direction of gravity does not act. Therefore, it is possible to determine the direction of insertion of the memory card inserted into the electronic device, on the basis of the fourth, fifth, and sixth sensor outputs obtained from the acceleration sensor in a case of capturing a moving image and a case of using the display device other than the case of capturing a moving image.

In a memory card according to still another aspect of the present invention, it is preferable that the determination unit acquires information about the direction of insertion through a network on the basis of device information of the electronic device. In a case where the device information of the electronic device on which the memory card is mounted can be obtained, it is possible to connect to the network (Internet) and retrieve the direction of insertion of the memory card in the acquired device information of the electronic device or access the service server for notifying the direction of insertion of the memory card. Thereby, it is possible to acquire information about the direction of insertion of the memory card from a service server on the basis of the device information of the electronic device.

According to still another aspect of the present invention, the memory card further comprises an electronic compass. It is preferable that the determination unit determines the direction of insertion on the basis of a sensor output indicating a magnetic flux density detected by the electronic compass or on the basis of a sensor output indicating a magnetic flux density detected by the electronic compass and the first, second, and third sensor outputs detected by the gyro sensor. For example, it is possible to determine the direction of insertion of the memory card inserted into the electronic device, on the basis of (change in) the sensor output in magnetic flux density detected by the electronic compass in a case where swinging the electronic device such that the front of the electronic device is stopped so as to face north. The direction of insertion of the memory card inserted into the electronic device may be determined by using all the first, second, and third sensor outputs detected by the gyro sensor in a case of swinging the electronic device.

In the memory card according to still another aspect of the present invention, it is preferable that the electronic device includes an electronic compass, and the determination unit determines the direction of insertion on the basis of a sensor output indicating an azimuth direction detected by the electronic compass and the first, second, and third sensor outputs detected by the gyro sensor. In a case where the electronic device is provided with an electronic compass, the determination unit is able to determine the direction of insertion of the memory card by matching the first, second, and third sensor outputs detected by the gyro sensor with the sensor output indicating the azimuth direction of the electronic device acquired in a case where the electronic device is swung.

According to still another aspect of the present invention, the memory card further comprises a blur correction unit that corrects blurring of the moving image on the basis of the moving image recorded in the first recording unit and the first, second, and third sensor outputs recorded in the second recording unit. It is preferable that the determination unit assumes the direction of insertion and determines, as the direction of insertion of the memory card into the electronic device, the assumed direction of insertion in a case where the blurring of the moving image corrected by the blur correction unit is minimized on the basis of the assumed direction of insertion. The blur correction unit does not need to reproduce a moving image. Therefore, for example, on the basis of two images at different times in the moving image and the first, second, and third sensor outputs of the gyro sensors detected to correspond to the two images 2, assuming the direction of insertion, it is possible to determine, as the direction of insertion of the memory card into the electronic device, the direction of insertion in a case where blurring (amounts of deviation) of the two images in which blurring is corrected is minimized.

According to still another aspect of the present invention, there is provided a moving image reproduction device comprising: an information acquisition unit that acquires the moving image, the first, second, and third sensor outputs and information indicating the direction of insertion, from the above-mentioned memory card; a blur correction unit that allocates the first, second, and third sensor outputs to sensor outputs corresponding to the yaw direction, the pitch direction, and the roll direction of the acquired moving image on the basis of the obtained information indicating the direction of insertion, and corrects blurring in the yaw direction, the pitch direction, and the roll direction of the moving image by using the respective sensor outputs; and an output unit that outputs the moving image in which blurring is corrected by the blur correction unit.

According to the aspect of the present invention, the moving image recorded in the memory card, the first, second, and third sensor outputs of the gyro sensor, and the information indicating the direction of insertion of the memory card are acquired. The relationship between the first, second, and third sensor outputs of the gyro sensor and the yaw direction, the pitch direction, and the roll direction of the electronic device on which the memory card is mounted can be specified on the basis of the information indicating the direction of insertion of the memory card. Therefore, it is possible to correct blurring of the moving image by allocating the first, second, and third sensor outputs to the sensor outputs corresponding to the yaw direction, the pitch direction, and the roll direction of the moving image.

In the moving image reproduction device according to still another aspect of the present invention, it is preferable that the information acquisition unit acquires information indicating a rotation direction of the electronic device in a case of capturing the moving image, and the blur correction unit allocates the first, second, and third sensor outputs to sensor outputs corresponding to the yaw direction, the pitch direction, and the roll direction of the acquired moving image on the basis of the acquired information indicating the direction of insertion and the information indicating the rotation direction, and corrects blurring of the moving image in the yaw direction, the pitch direction, and the roll direction by using the allocated sensor outputs.

The information indicating the rotation direction of the electronic device in the case of capturing the moving image is about horizontal imaging and vertical imaging (for example, an imaging state in which the electronic device is rotated by 90 degrees clockwise or counterclockwise from the state of horizontal imaging). Between the horizontal imaging and the vertical imaging, the yaw direction, the pitch direction, and the roll direction of the electronic device are different (the yaw direction and the pitch direction are exchanged). Thus, between the horizontal imaging and the vertical imaging, the sensor outputs respectively corresponding to the yaw direction and the pitch direction are exchanged, and are used in correcting blurring of the moving image.

In the moving image reproduction device according to still another aspect of the present invention, it is preferable that the information acquisition unit acquires information of an imaging unit that captures the moving image among imaging units provided on a front side and a rear side of the electronic device, and the blur correction unit allocates the first, second, and third sensor outputs to sensor outputs corresponding to the yaw direction, the pitch direction, and the roll direction of the acquired moving image on the basis of the acquired information indicating the direction of insertion and the information of the imaging unit, and corrects blurring of the moving image in the yaw direction, the pitch direction, and the roll direction by using the allocated sensor outputs.

The electronic device such as a smartphone has not only an imaging unit provided on the front side of the device but also an imaging unit for self-imaging on the rear side of the device. In this case, in a case where information of the imaging unit that captured the moving image is acquired and particularly the moving image is captured by the imaging unit on the rear side, the yaw direction, the pitch direction, and the roll direction of the electronic device are different (negative and positive directions of the yaw direction and the pitch direction are exchanged). Thus, the positive and negative sensor outputs corresponding to the yaw direction and pitch direction are exchanged and used for blur correction of the moving image.

According to the present invention, the memory card with the gyro sensor is configured to have a function of determining the direction of insertion of the memory card in the electronic device. Thus, it is possible to specify a correspondence relationship between the sensor output in the direction of rotation about each axis of the orthogonal three-axis gyro sensor and the blurring of the moving image recorded in the memory card in the yaw direction, the pitch direction, and the roll direction. As a result, even in a case where the same memory card is applied to various electronic devices into which the memory card is inserted in different directions, it is possible to easily and appropriately correct blurring of the moving image by using the sensor output of the gyro sensor recorded in the memory card.

DESCRIPTION OF THE PREFERRED EMBODIMENTS

Hereinafter, preferred embodiments of a memory card and a moving image reproduction device according to the present invention will be described with reference to the attached drawings.

<Appearance of Memory Card>

Figure 1:
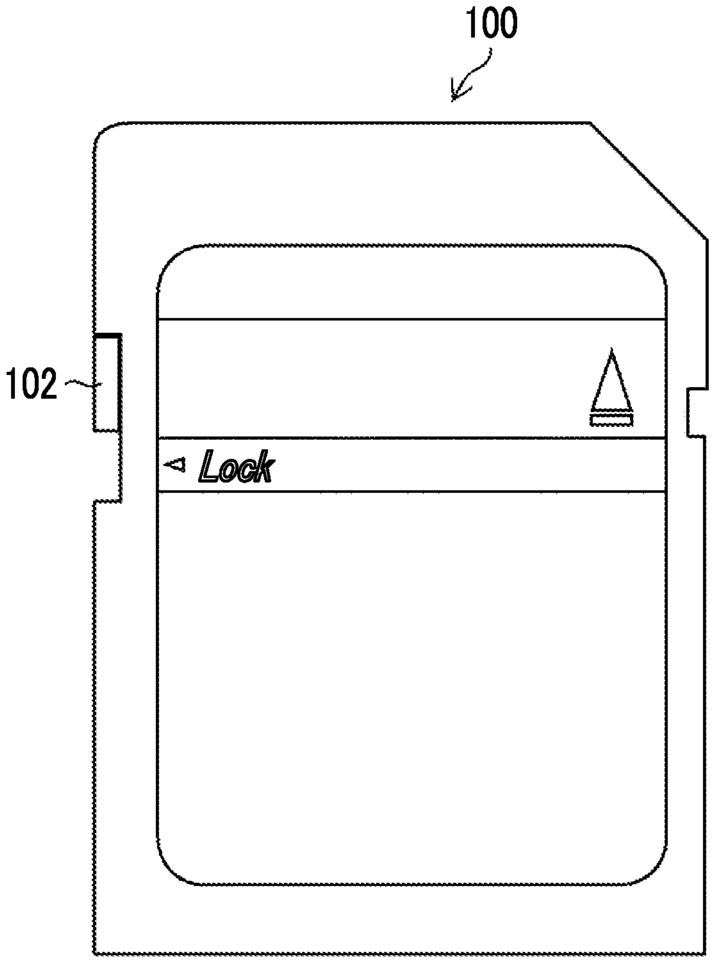
FIG. 1 is a front view of a memory card 100 according to the present invention.
Figure 2:
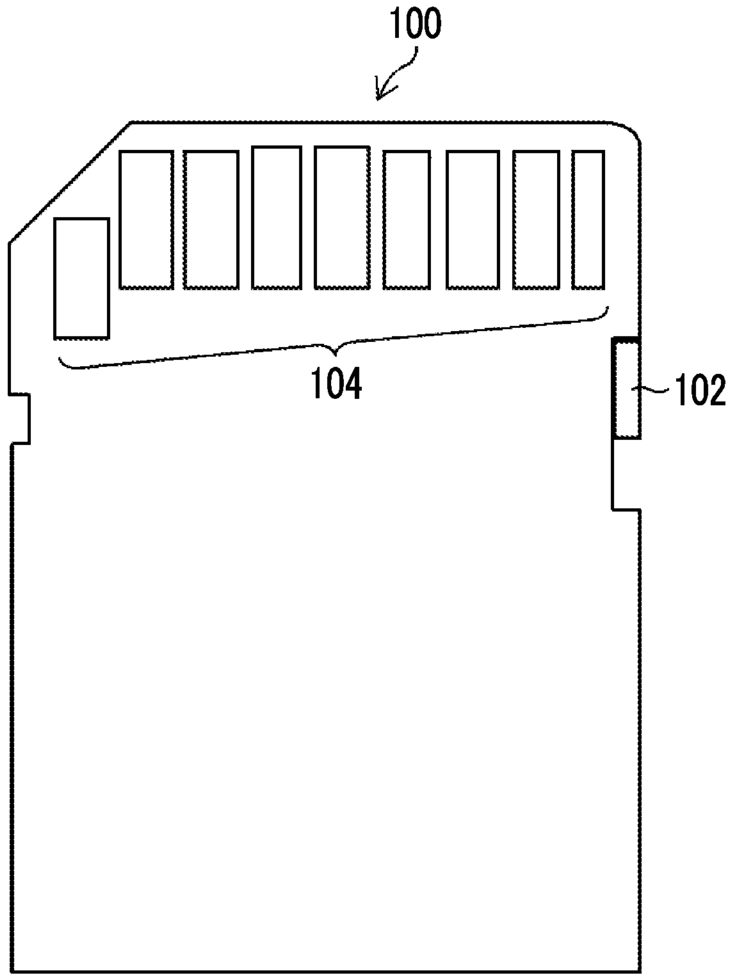
FIG. 2 is a rear view of the memory card 100 according to the present invention.

FIGS. 1 and 2 are external views of the memory card according to the present invention. FIG. 1 is a front view of the memory card, and FIG. 2 is a rear view of the memory card.

The memory card 100 shown in FIGS. 1 and 2 has the same appearance as an SD memory card (also referred to as an SD card) and can be used as an SD card.

A write-protect switch 102 is provided on the left side of the memory card 100 in FIG. 1, and nine terminals 104 are provided on a leading end portion on the rear side of the memory card 100 in the direction of insertion.

<Internal Structure of Memory Card>

Figure 3:
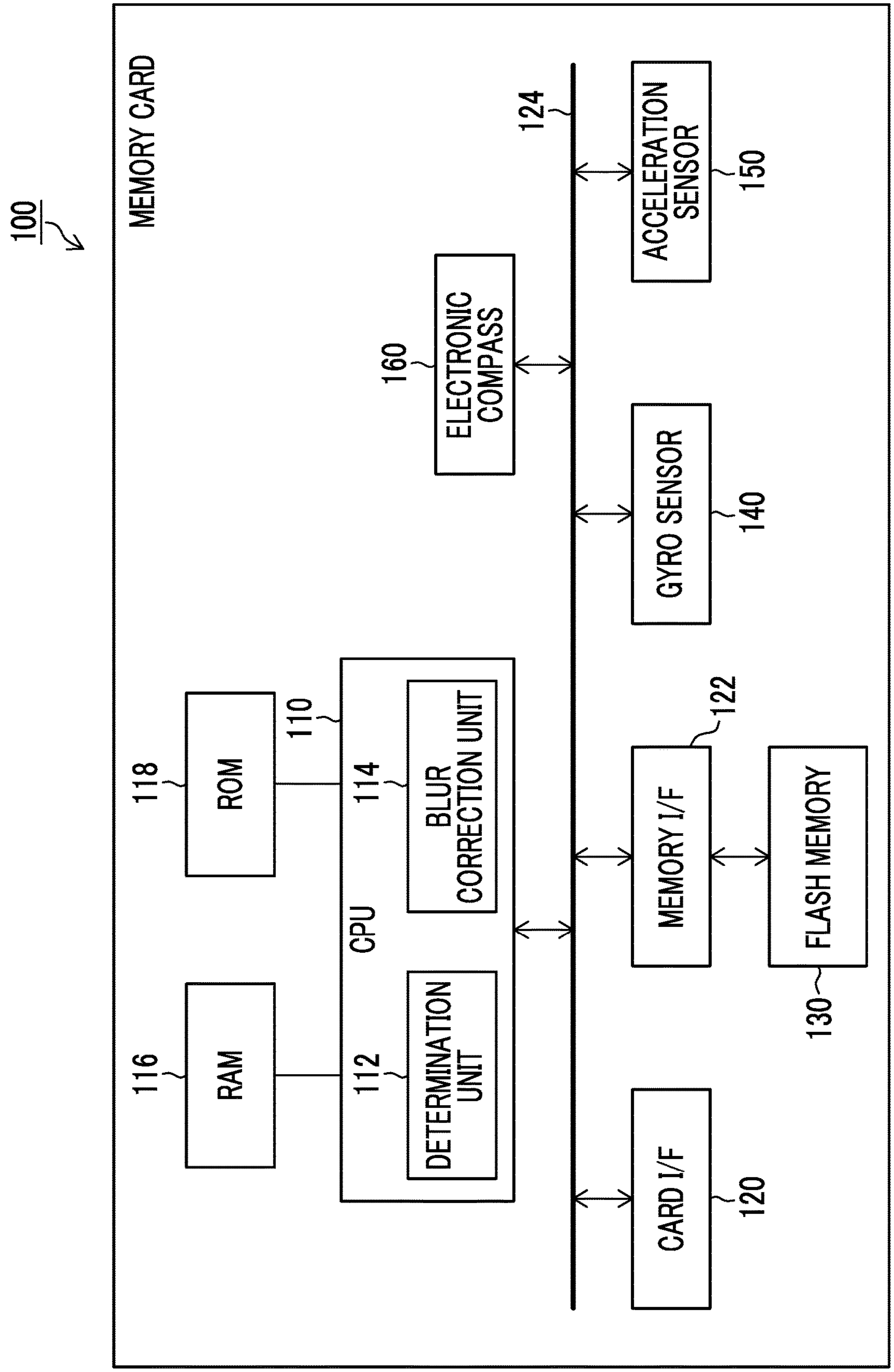
FIG. 3 is a block diagram showing an embodiment of the internal structure of the memory card 100.

FIG. 3 is a block diagram showing an embodiment of the internal structure of the memory card 100.

As shown in FIG. 3, the memory card 100 mainly includes a central processing unit (CPU) 110, a card interface (card I/F) 120, a memory interface (memory I/F) 122, a flash memory which is a readable and writable nonvolatile memory 130, a gyro sensor 140, an acceleration sensor 150, and an electronic compass 160.

The memory card 100 of this example can be attached to and detached from an electronic device (imaging device) such as a digital camera, a digital video camera, a smartphone with a camera, a tablet terminal with a camera, or the like, which has an imaging unit for capturing a moving image, and is suitable as an external memory for such a type of the imaging devices. That is, the memory card 100 records moving image data indicating a moving image captured by the imaging device, and records information about camera shake of the imaging device which is detected by the memory card 100 itself and occurs while the moving image is being captured.

A random access memory (RAM) 116 and a read only memory (ROM) 118 are connected to (or built into) the CPU 110, and the CPU 110 integrally controls each unit of the memory card 100 by using the RAM 116 as a work area in accordance with the control program stored in the ROM 118. Further, the CPU 110 has functions as a determination unit 112 that determines the direction of insertion of the memory card 100 into the device, and a blur correction unit 114 that corrects blurring of the moving image. Furthermore, the determination unit 112 and the blur correction unit 114 will be described in detail later.

The card I/F 120 is a portion that includes the nine terminals 104 shown in FIG. 2 and reads and writes data and exchanges commands with a device to which the memory card 100 is inserted and to which the terminal 104 is connected.

The memory I/F 122 is a portion that writes information to the flash memory 130 and reads information from the flash memory 130 on the basis of an instruction issued from the CPU 110, and exchanges data, address information, status information, commands, and the like with the flash memory 130 through the internal bus 124.

The gyro sensor 140 detects each of the angular velocities in the directions of axial rotation about the respective three orthogonal axes.

Figure 4:
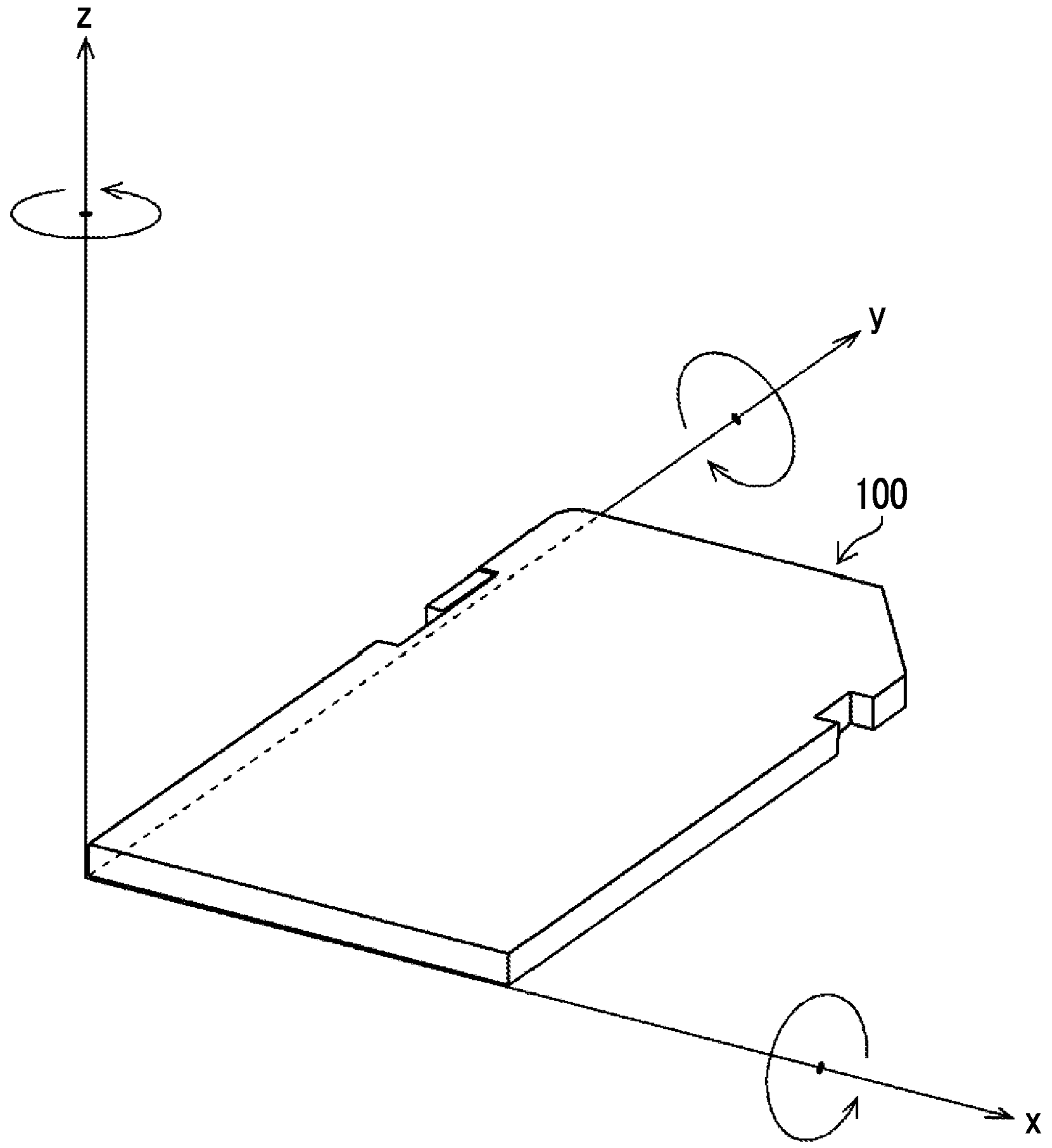
FIG. 4 is a diagram used for explaining a card coordinate system of the memory card 100.

The xyz coordinate system of the memory card 100 as shown in FIG. 4 is defined as a card coordinate system. The gyro sensor 140 detects the angular velocity in the direction of rotation about the x axis, the angular velocity in the direction of rotation about the y axis, and the angular velocity in the direction of rotation about the z axis, and outputs angular velocity data (first, second, and third sensor outputs) indicating the angular velocities in the respective directions of rotation about the three orthogonal axes (xyz axes). The angular velocities detected by the gyro sensor 140 are set to be positive in the directions of axial rotation indicated by the arrows in FIG. 4.

The acceleration sensor 150 detects each of accelerations in the respective axis directions of the three orthogonal axes, detects each of the angular velocity in the x axis direction, the angular velocity in the y axis direction, and the angular velocity in the z axis direction in the card coordinate system shown in FIG. 4, and outputs acceleration data (fourth, fifth, and sixth sensor outputs) indicating angular velocities in the respective axis directions. Further, the accelerations detected by the acceleration sensor 150 are set to be positive in the directions indicated by the arrows of the xyz axes in FIG. 4.

The electronic compass 160 includes a geomagnetic sensor that detects each of magnetic flux densities of the geomagnetism in the respective axis directions of the three orthogonal axes, and detects each of a magnetic flux density in the x axis direction, a magnetic flux density in the y axis direction, and a magnetic flux density in the z axis direction in the card coordinate system shown in FIG. 4, and outputs the geomagnetic data (sensor outputs) indicating the magnetic flux densities of the geomagnetism in the respective axis directions.

[Digital Camera]

Figure 5:
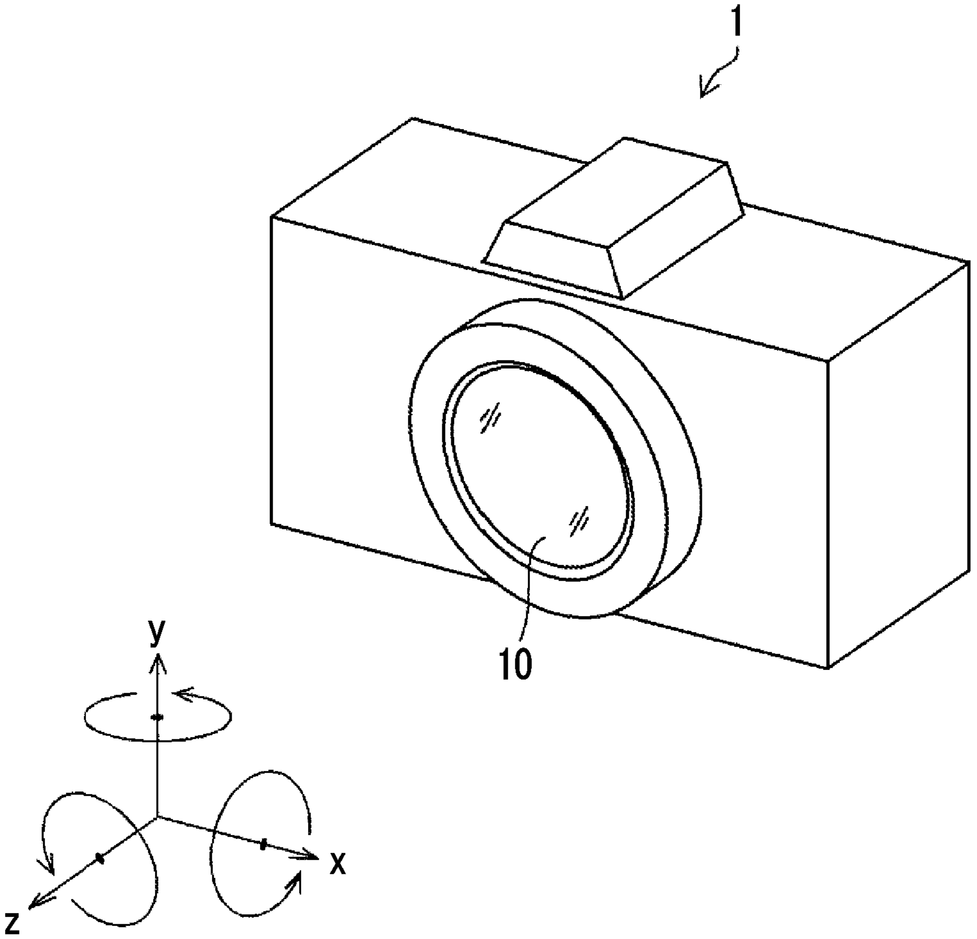
FIG. 5 is an external view showing a digital camera 1 using the memory card 100.

FIG. 5 is an external view showing an example of a digital camera in which the memory card 100 is used as an external recording medium.

The XYZ coordinate system of the digital camera 1 as shown in FIG. 5 is defined as a camera coordinate system. In the camera coordinate system (XYZ coordinate system), in a case where the bottom surface of the substantially rectangular parallelepiped digital camera 1 is on the horizontal plane, the vertical direction is the Y axis direction, the direction of the optical axis of the imaging lens 10 is the Z axis direction, and the horizontal direction of the digital camera 1 and the direction orthogonal to the Y axis direction and the Z axis direction are the X axis direction.

Figure 6:
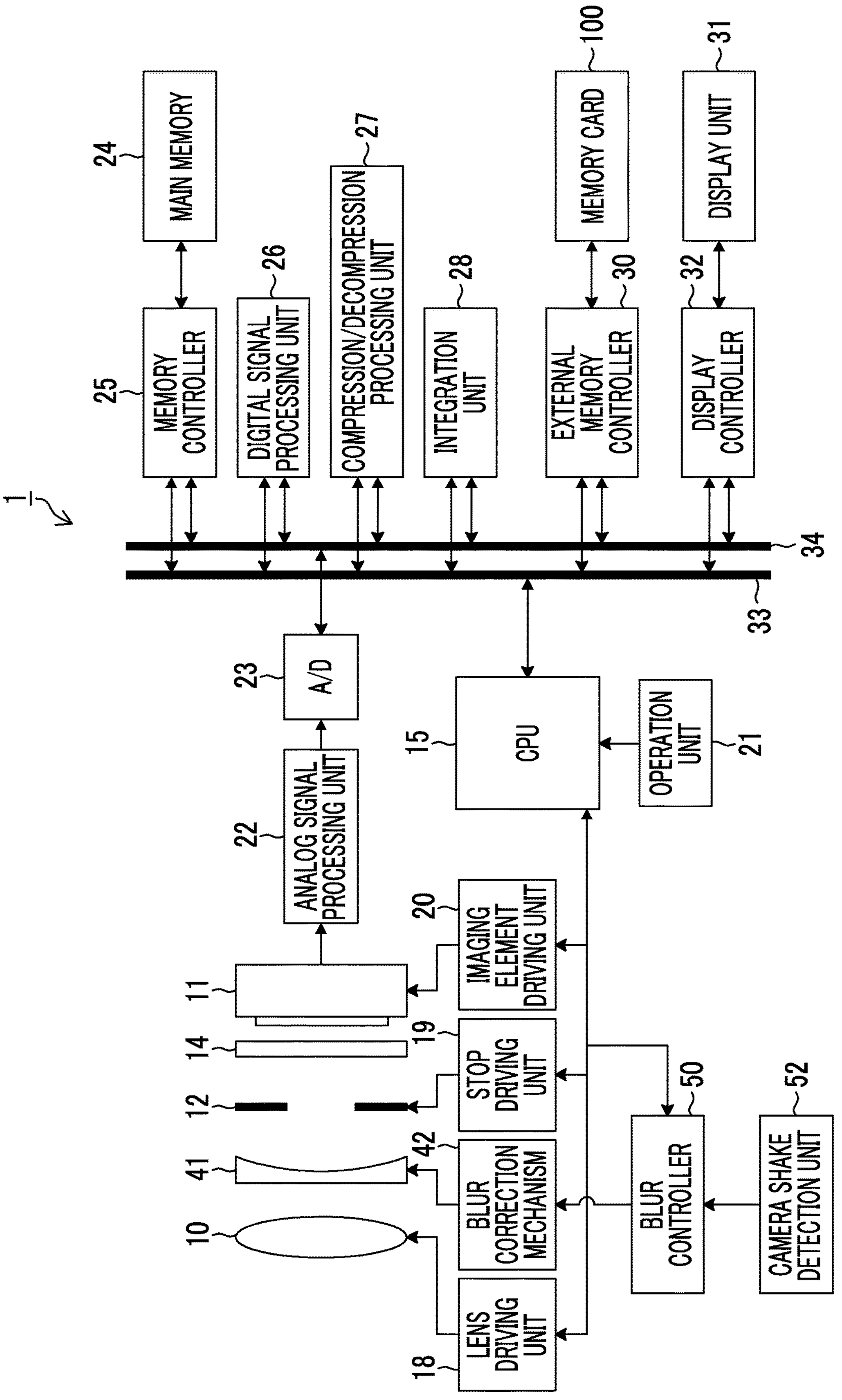
FIG. 6 is a block diagram showing the internal structure of the digital camera 1.

FIG. 6 is a block diagram showing the internal structure of the digital camera 1.

As shown in FIG. 6, the digital camera 1 is configured to comprise an imaging lens 10 and an imaging element 11 constituting the imaging unit, a CPU 15, an imaging element driving unit 20, an operation unit 21, an analog signal processing unit 22, an analog/digital (A/D) converter 23, a digital signal processing unit 26, a correction lens 41 functioning as a blur correction optical system, a blur correction mechanism 42, a blur controller 50, a camera shake detection unit 52, and the like.

Each unit operates under the control of the CPU 15, and the CPU 15 controls each unit of the digital camera 1 by executing a predetermined control program on the basis of an input from the operation unit 21.

The CPU 15 has a built-in program ROM, and not only the control programs executed by the CPU 15 but also various data and the like necessary for control are recorded in the program ROM. The CPU 15 reads the control programs recorded in the program ROM to the main memory 24 and sequentially executes the control programs, thereby controlling each unit of the digital camera 1.

The main memory 24 is used not only as an area for processing execution of the programs but also as an area for temporarily storing image data and the like and various working areas.

The operation unit 21 includes general operation means of a camera such as a release button, a power switch, an imaging mode dial, and a blur correction switch, and outputs a signal corresponding to the operation to the CPU 15.

The imaging lens 10 is configured to include a zoom lens and a focus lens (not shown). On the basis of the command from the CPU 15, the lens driving unit 18 changes the angle of view by moving the zoom lens back and forth on the optical axis thereof, and moves the focus lens back and forth on the optical axis thereof to adjust the focal point.

Subject light having passed through the imaging lens 10 is received by the imaging element 11 through the correction lens 41, a stop 12, and an infrared cut filter 14.

The correction lens 41 is driven by the blur correction mechanism 42. The blur correction mechanism 42 supports the correction lens 41 movably in two orthogonal directions (X direction and Y direction) in a plane perpendicular to the optical axis, and moves the correction lens 41 in each of the X direction and the Y direction by using a voice coil motor which is not shown.

The camera shake detection unit 52 includes a gyro sensor and an acceleration sensor, and detects camera shake (angular velocity and acceleration) of the digital camera 1.

As shown in FIG. 5, the gyro sensor included in the camera shake detection unit 52 detects the angular velocity in the direction of rotation about each axis of the camera coordinate system. The angular velocity in the direction of rotation about the X axis is an angular velocity in the pitch direction of the digital camera 1. The angular velocity in the direction of rotation about the Y axis is an angular velocity in the yaw direction of the digital camera 1. The angular velocity in the direction of rotation about the Z axis is an angular velocity in the roll direction of the digital camera 1.

Similarly, the acceleration sensor included in the camera shake detection unit 52 detects the accelerations in the respective axis directions of the camera coordinate system shown in FIG. 5. The acceleration in the X axis direction is an acceleration in the horizontal direction of the digital camera 1. The acceleration in the Y axis direction is an acceleration in the vertical direction of the digital camera 1. The acceleration in the Z axis direction is an acceleration in the front-rear direction of the digital camera 1.

The blur controller 50 controls the blur correction mechanism 42 so as to move the correction lens 41 in the XY direction within a plane perpendicular to the optical axis in accordance with the detection signal of camera shake by the camera shake detection unit 52. Details of the blur correction will be described later.

The reference numeral 12 denotes a stop, and the stop driving unit 19 controls the opening amount of the stop 12 on the basis of a command from the CPU 15, and adjusts the exposure amount of the imaging element 11 so as to be an appropriate exposure amount.

The infrared cut filter 14 removes the infrared component of the subject light incident into the imaging element 11.

The imaging element 11 is constituted by a complementary metal-oxide semiconductor (CMOS) type color image sensor. The imaging element 11 is not limited to the CMOS type, but may be an XY address type or charge coupled device (CCD) type image sensor.

The imaging element 11 is constituted by a plurality of pixels arranged in a matrix with a predetermined pattern arrangement (Bayer arrangement, X-Trans (registered trademark) arrangement, honeycomb arrangement or the like). Each pixel includes a microlens, a color filter of red (R), green (G), or blue (B), and a photoelectric conversion unit (a photodiode or the like).

The subject light is imaged on the light-receiving surface of the imaging element 11 through the imaging lens 10, and is converted into an electric signal by each light receiving element. That is, each pixel of the imaging element 11 accumulates electric charge according to the amount of incident light, and an electric signal according to the amount of electric charge accumulated in each pixel is read from the imaging element 11 as an image signal.

The imaging element driving unit 20 performs read control of the image signals from the imaging element 11 in accordance with a command from the CPU 15. Further, the imaging element driving unit 20 has an electronic shutter function for simultaneously discharging (simultaneously resetting) the electric charges accumulated in the respective pixels of the imaging element 11 to start exposure in accordance with the electronic shutter control signal from the CPU 15.

The analog signal processing unit 22 performs various kinds of analog signal processing on the analog image signals obtained by capturing an image of the subject through the imaging element 11. The analog signal processing unit 22 is configured to include a sampling hold circuit, a color separation circuit, an automatic gain control (AGC) circuit, and the like. The AGC circuit functions as a sensitivity adjustment unit that adjusts the sensitivity (ISO sensitivity, ISO: International Organization for Standardization) at the time of imaging, and adjusts the gain of the amplifier that amplifies the input image signals, such that the signal levels of the image signals are set in an appropriate range.

The A/D converter 23 converts the analog image signals, which are output from the analog signal processing unit 22, into digital image signals. In a case where the imaging element 11 is a CMOS type imaging element, the analog signal processing unit 22 and the A/D converter 23 are mostly built into the imaging element 11.

Not only the CPU 15 and the memory controller 25 but also the digital signal processing unit 26, the compression/decompression processing unit 27, the integration unit 28, the external memory controller 30, the display controller 32, and the like are connected to the control bus 33 and the data bus 34. Those are capable of transmitting and receiving information to each other through the control bus 33 and the data bus 34.

The image data (mosaic image data) for each pixel of RGB, which is output through the imaging element 11, the analog signal processing unit 22, and the A/D converter 23 in a case of capturing a still image or a moving image, is input to the main memory 24 through the memory controller 25 and is temporarily stored.

The digital signal processing unit 26 applies various kinds of the digital signal processing to the image data stored in the main memory 24. The digital signal processing unit 26 appropriately reads the image data stored in the main memory 24, performs digital signal processing on the read image data, and stores the image data subjected to the digital signal processing in the main memory 24 again. The digital signal processing includes offset processing, gain control processing including sensitivity correction, gamma correction processing, demosaic processing (also referred to as demosaicing processing), RGB/YCrCb conversion processing, and the like. The demosaic processing is, for example, processing of calculating color information of all RGB for each pixel from a mosaic image consisting of RGB in the case of an imaging element consisting of color filters of three colors of RGB, and generates demosaiced image data of three colors of RGB from the mosaic data (dot sequential RGB data).

The RGB/YCrCb conversion processing converts the demosaiced RGB data into luminance data (Y) and color difference data (Cr and Cb).

At the time of recording a still image or a moving image, the compression/decompression processing unit 27 once compresses uncompressed luminance data Y and color difference data Cb and Cr stored in the main memory 24. For example, the image is compressed in the joint photographic coding experts group (JPEG) format in a case of a still image, and is compressed in H.264 format in a case of a moving image. The image data compressed by the compression/decompression processing unit 27 is recorded in the memory card 100 through the external memory controller 30. In addition, the compression/decompression processing unit 27 applies decompression processing to the compressed image data obtained from the memory card 100 through the external memory controller 30 in the playback mode, thereby generating uncompressed image data.

In accordance with a command from the CPU 15, the integration unit 28 loads image signals of R, G, and B stored in the main memory 24 and calculates integrated values necessary for auto exposure (AE) control. The CPU 15 calculates the luminance value from the integrated value and obtains the exposure value from the luminance value. Further, the F number and the shutter speed are determined on the basis of the exposure value in accordance with a predetermined program diagram.

The external memory controller 30 performs control of recording the image data compressed by the compression/decompression processing unit 27 in the memory card 100. In addition, the external memory controller 30 performs control to read the compressed image data from the memory card 100.

The display controller 32 performs control to cause the display unit 31 to display the uncompressed image data stored in the main memory 24 (or a video memory which is not shown). The display unit 31 is constituted by a display device such as a liquid crystal display device or organic electroluminescence.

In a case of displaying a live view image on the display unit 31, the digital image signals continuously generated by the digital signal processing unit 26 are temporarily stored in the main memory 24. The display controller 32 converts the digital image signals temporarily stored in the main memory 24 through a signal format for display and sequentially outputs the image signals to the display unit 31. In such a manner, a captured image is displayed on the display unit 31 in real time, and the display unit 31 can be used as an electronic view finder.

The display unit 31 is also used as a display screen for a user interface.

<Principle of Camera Shake Correction>

Next, the principle of camera shake correction of the digital camera 1 will be described.

In the digital camera 1, the user is able to switch between the ON mode for camera shake and the OFF mode for camera shake by using the operation unit 21. In the ON mode for camera shake, movement of the correction lens 41 is controlled such that the subject image blurring (image blurring) caused by shake (camera shake) of the digital camera 1 is canceled. In the OFF mode for camera shake, control is performed such that the correction lens 41 is kept stopped.

In a case where the ON mode for camera shake is selected, the camera shake detection unit 52 detects angular velocities in the direction of rotation about the X axis (yaw direction) and the direction of rotation about the Y axis (pitch direction) of the digital camera 1, and outputs the angular velocity signals indicating the detected angular velocities.

The blur controller 50 integrates angular velocity signals in the pitch direction and the yaw direction input from the camera shake detection unit 52 and generates angle signals (pitch angle signal and yaw angle signal) indicating the angles of blurring in the pitch direction and yaw direction of the digital camera 1 in real time. On the basis of the generated pitch angle signal and yaw angle signal, in order to cancel the image blur caused by the camera shake in the pitch direction and the yaw direction of the digital camera 1, the blur correction mechanism 42 moves the correction lens 41 in the up-down direction (Y direction) and the right-left direction (X direction). As a result, it is possible to correct angular blurring caused by rotational motions in the directions of rotation about the respective axes of the digital camera 1.

Meanwhile, image blurring occurring in the digital camera 1 includes not only angular blurring of the digital camera 1 but also so-called translational blurring that occurs, for example, due to the parallel movement of the digital camera 1 in each axis direction. This translational blurring tends to increase the image blurring as the imaging magnification increases. For this reason, it is preferable to correct translational blurring, for example, in a case where close-up imaging is performed with the digital camera 1 held in the hand.

In a case of correcting translational blurring of the digital camera 1, the blur controller 50 calculates amounts of translational blurring in the X axis direction and the Y axis direction by integrating the acceleration signals indicating the accelerations in the X axis direction and the Y axis direction detected by the acceleration sensor of the camera shake detection unit 52 twice. Then, the blur controller 50 calculates the amount of blurring on the imaging surface of the imaging element 11 on the basis of the amounts of translational blurring and the image magnification at the time of imaging, and drives the correction lens 41 through the blur correction mechanism 42 so as to cancel the amount of blurring by using the calculated amount of blurring. As a result, translational blurring can also be corrected.

[Insertion Direction of Memory Card]

FIGS. 7 to 11 are diagrams each showing an example of the direction of insertion of the memory card 100 into the imaging device including the digital camera.

Figure 7:
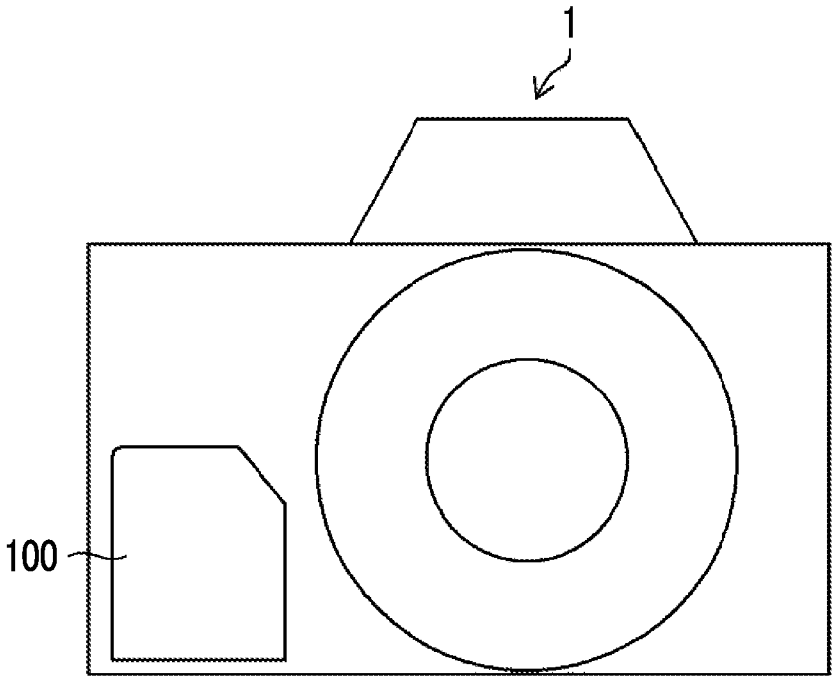
FIG. 7 is a diagram showing an arrangement relationship between the digital camera 1 and the memory card 100.

In the digital camera 1 shown in FIG. 7, the memory card 100 is inserted from the bottom side of the digital camera 1 and is inserted in a direction in which the front side of the memory card 100 (refer to FIG. 1) coincides with the front side of the digital camera 1.

Therefore, the respective axis directions of the card coordinate system (xyz coordinate system) of the memory card 100 defined in FIG. 4 coincides with the respective axis directions of the camera coordinate system (XYZ coordinate system) of the digital camera 1 defined in FIG. 5.

In this case, the first, second, and third sensor outputs indicate the angular velocities which are detected by the gyro sensor 140 of the memory card 100 mounted on the digital camera 1. The angular velocities are the angular velocity in the direction of rotation about the x axis, the angular velocity in the direction of rotation about the y axis, and the angular velocity in the direction of rotation about the z axis in the xyz coordinate system. In addition, the first, second, and third sensor outputs respectively indicate the angular velocity in the direction of rotation about the X axis (pitch direction), the angular velocity in the direction of rotation about the Y axis (yaw direction), and the angular velocity in the direction of rotation about the Z axis (roll direction), in the XYZ coordinate system of the digital camera 1.

Figure 8:
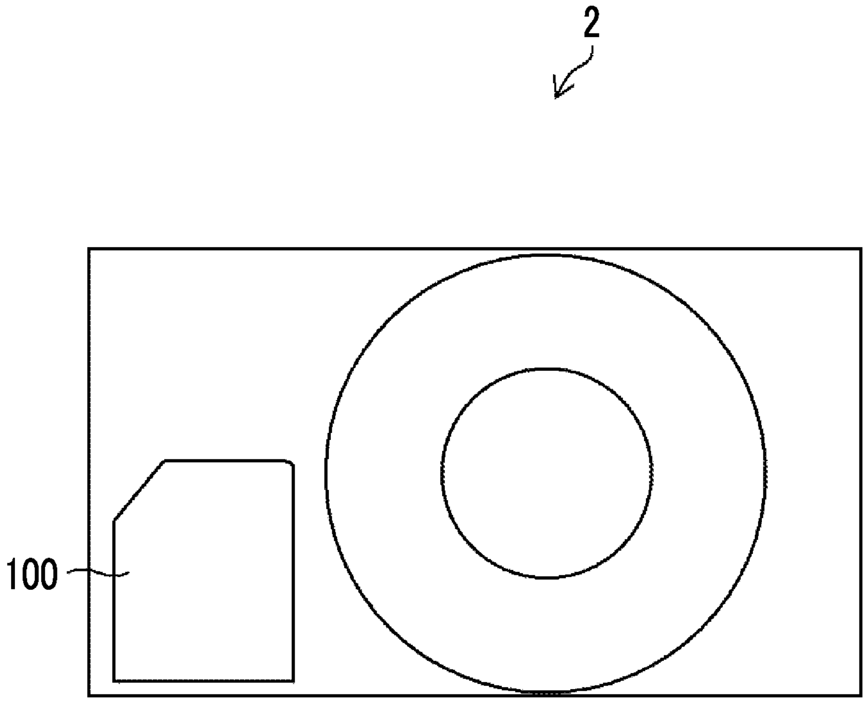
FIG. 8 is a diagram showing an arrangement relationship between a digital camera 2 and the memory card 100.

In the digital camera 2 shown in FIG. 8, the memory card 100 is inserted from the bottom side of the digital camera 2 and is inserted in a direction in which the rear side of the memory card 100 (refer to FIG. 2) coincides with the front side of the digital camera 2.

In this case, the respective axis directions of the card coordinate system of the memory card 100 do not coincide with the respective axis directions of the camera coordinate system of the digital camera 2. Specifically, the positive and negative signs of the X axis direction and the Z axis direction of the camera coordinate system are opposite to those of the x axis direction and the z axis direction of the card coordinate system.

Figure 9:
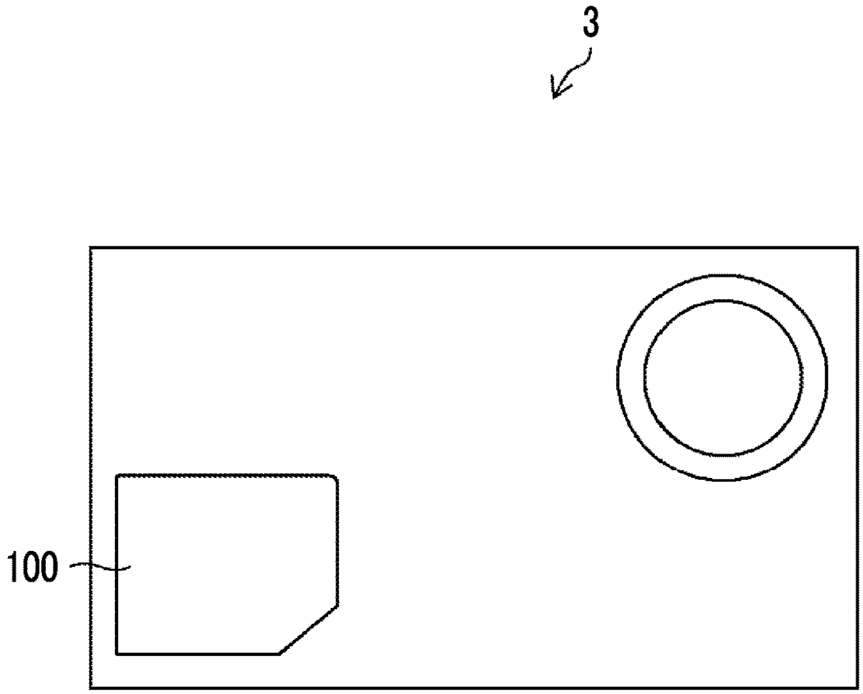
FIG. 9 is a diagram showing an arrangement relationship between a digital camera 3 and the memory card 100.

In the digital camera 3 shown in FIG. 9, the memory card 100 is inserted from the left side of the digital camera 3 in FIG. 9 and is inserted in a direction in which the front side of the memory card 100 coincides with the front side of the digital camera 1.

In this case, the respective axis directions of the card coordinate system of the memory card 100 do not coincide with the respective axis directions of the camera coordinate system of the digital camera 3. Specifically, the x axis direction and the y axis direction of the card coordinate system are exchanged with the X axis direction and the Y axis direction of the camera coordinate system. In addition, the positive and negative signs in the x axis direction are reversed.

Figure 10:
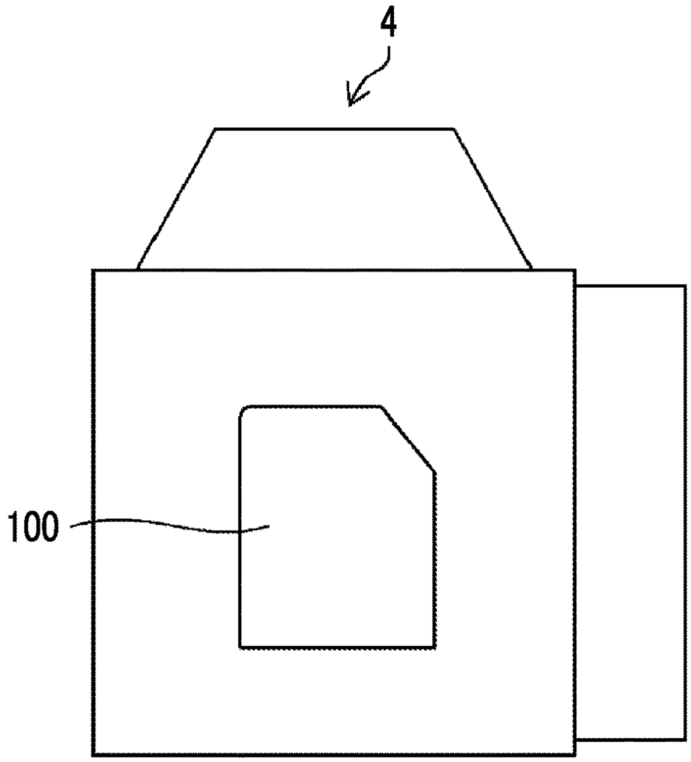
FIG. 10 is a diagram showing an arrangement relationship between a digital camera 4 and the memory card 100.

In the digital camera 4 shown in FIG. 10, the memory card 100 is inserted from the bottom side of the digital camera 3 and is inserted in a direction in which the front side of the memory card 100 coincides with the lateral side of the digital camera 1 in FIG. 10.

In this case, the respective axis directions of the card coordinate system of the memory card 100 do not coincide with the respective axis directions of the camera coordinate system of the digital camera 4. Specifically, the x axis direction and the z axis direction of the card coordinate system are exchanged with the X axis direction and the Z axis direction of the camera coordinate system. In addition, the positive and negative signs in the z axis direction are reversed.

Figure 11:
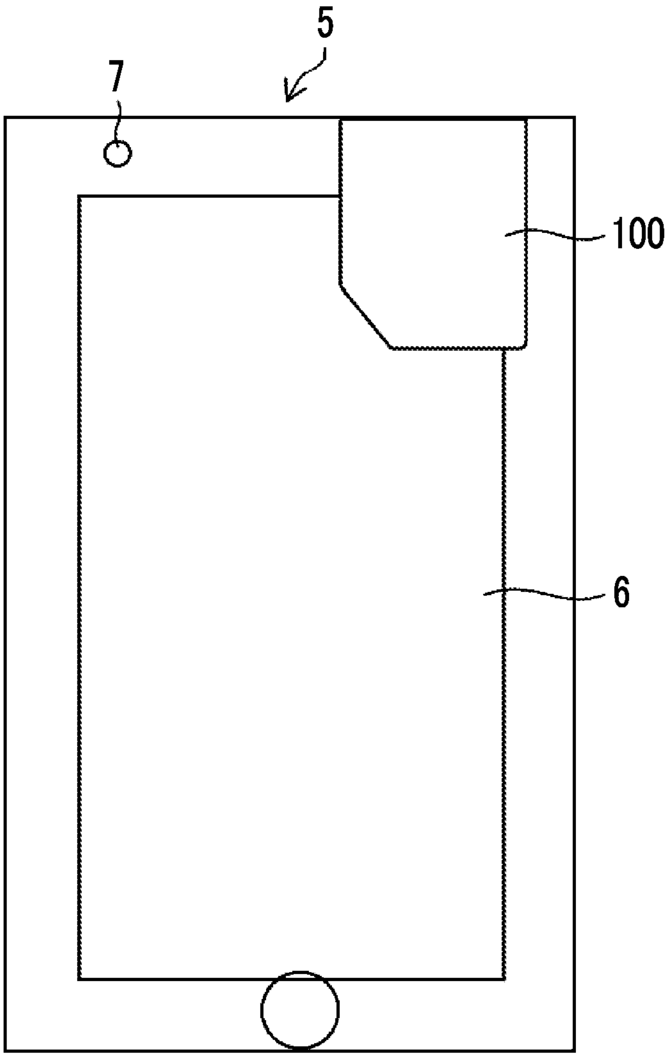
FIG. 11 is a diagram showing an arrangement relationship between a smartphone 5 and the memory card 100.

In the smartphone 5 shown in FIG. 11, the memory card 100 is inserted from the upper side of the smartphone 5 and is inserted in a direction in which the front side of the memory card 100 coincides with the rear side of the smartphone 5 (the side on which the display input unit 6 is provided) in FIG. 11. It is assumed that an imaging unit which is not shown is provided on the front side of the smartphone 5. The reference numeral 7 denotes an imaging unit for self-imaging provided on the rear side of the smartphone 5.

In this case, the respective axis directions of the card coordinate system of the memory card 100 do not coincide with the respective axis directions of the camera coordinate system of the imaging unit provided on the front side of the smartphone 5. Specifically, the positive and negative signs of the Y axis direction and the Z axis direction of the camera coordinate system are opposite to those of the y axis direction and the z axis direction of the card coordinate system.

Figures 12, 13:
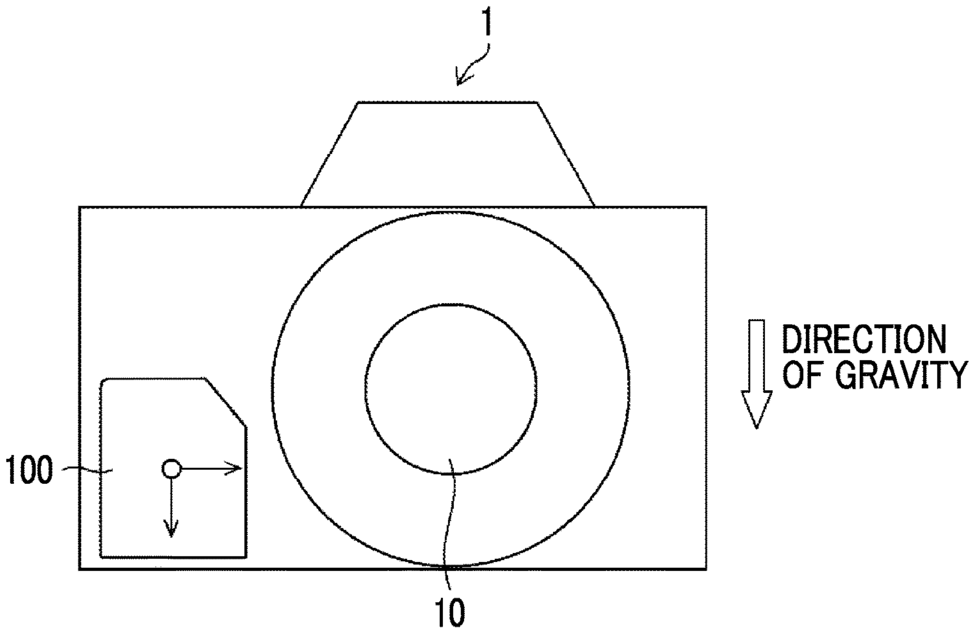
FIG. 12 is a table showing a relationship between the camera coordinate system and the card coordinate system which change with the direction of insertion of the memory card 100 shown in FIGS. 7 to 11.
FIG. 13 is a diagram showing a general posture of the digital camera 1 in an imaging state of a live view image or a moving image.

FIG. 12 is a table showing a relationship between the camera coordinate system and the card coordinate system which change with the direction of insertion of the memory card 100 shown in FIGS. 7 to 11.

[Method for Determining Insertion Direction of Memory Card]

The memory card 100 according to the present invention records moving image data indicating a moving image captured by an imaging device such as the digital camera 1, and also records information about camera shake of the imaging device which is detected by the memory card 100 itself in association with moving image data and occurs while the moving image is being captured. The information includes angular velocity data (first, second, and third sensor outputs) indicating the angular velocities in the direction of rotation about respective axes of the card coordinate system detected by the gyro sensor 140, and acceleration data (fourth, fifth, and sixth sensor outputs) indicating accelerations in the respective axis directions of the card coordinate system detected by the acceleration sensor 150. However, as described above, the memory card 100 is commonly used for imaging devices such as various digital cameras 1 to 4 and the smartphone 5 having different directions of insertion of memory cards. Depending on the direction of insertion of the memory card 100 into the imaging device, it is determined which axis of the camera coordinate system each of the first, second, and third sensor outputs of the gyro sensor 140 is the angular velocity in the direction of rotation about. Depending on the direction of insertion of the memory card 100 into the imaging device, it is determined which axis direction of the camera coordinate system each of the fourth, fifth, and sixth sensor outputs of the acceleration sensor 150 is the angular velocity in.

The determination unit 112 in the CPU 110 of the memory card 100 shown in FIG. 3 determines the direction of insertion of the memory card 100 into the imaging device by using the memory card itself <First Determination Method>

FIG. 13 is a diagram showing a general posture of the digital camera 1 in a case of capturing a live view image or a moving image.

In FIG. 13, the memory card 100 is inserted from the bottom side of the digital camera 1 as in FIG. 7 and is inserted in a direction in which the front side of the memory card 100 coincides with the front side of the digital camera 1.

In a case where the digital camera 1 is in the posture shown in FIG. 13, a large gravitational acceleration is applied in the negative direction of the y axis of the card coordinate system of the memory card 100, and the accelerations in the other x axis direction and z axis direction are accelerations accompanying translational blurring, and are thus smaller than the gravitational acceleration.

Therefore, by comparing the magnitudes of the fourth, fifth, and sixth sensor outputs of the acceleration sensor 150 in the case where the digital camera 1 is in the posture shown in FIG. 13, the direction of gravity of the memory card 100 inserted into the digital camera 1 can be determined. That is, it is possible to specify the relationship between the Y axis direction corresponding to the direction of gravity in the camera coordinate system of the digital camera 1 and the direction of gravity of the memory card 100 inserted into the digital camera 1.

Figure 14:
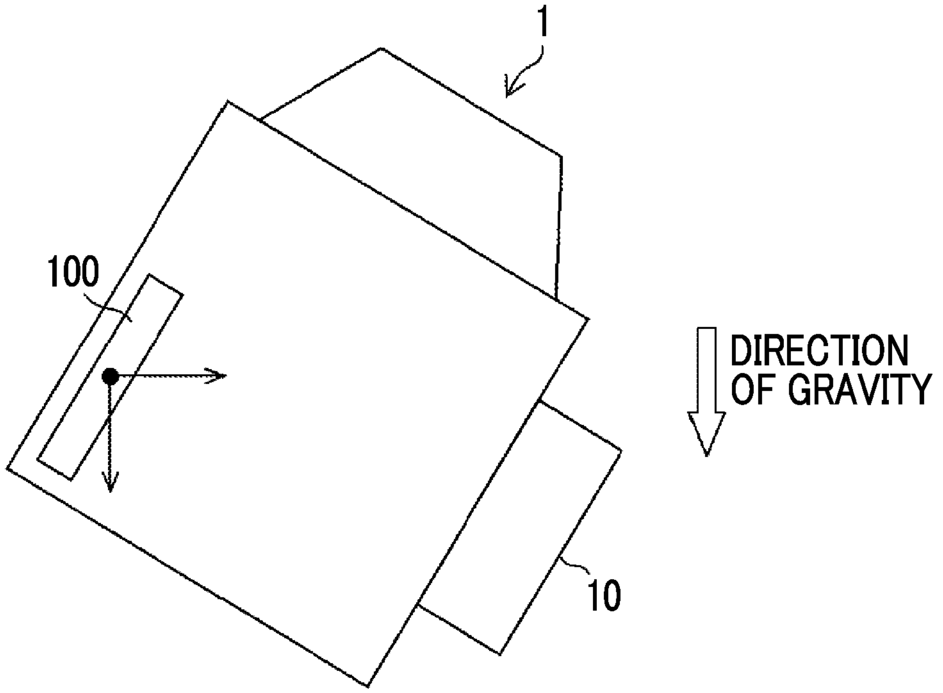
FIG. 14 is a diagram showing a posture of the digital camera 1 in which the imaging lens 10 is tilted downward.

FIG. 14 is a diagram showing the posture of the digital camera 1 in which the imaging lens 10 is tilted downward.

The posture of the digital camera 1 shown in FIG. 14 is a posture in a case where a menu screen is displayed on the display unit 31 (FIG. 6) provided on the rear side of the digital camera 1 and various setting operations (setting operation such as the number of pixels recorded, the frame rate of the moving image, and the imaging sensitivity) are performed using the operation section 21 and the like while the menu screen is viewed or in a case where a moving image is reproduced on the display unit 31 and is viewed. As a result, the display screen of the display unit 31 faces upward, and the imaging lens 10 is tilted downward.

In a case where the digital camera 1 is in the posture shown in FIG. 14, a gravitational acceleration is applied in the negative direction of the y axis and the positive direction of the z axis of the card coordinate system of the memory card 100, and the acceleration in the other x axis direction is an acceleration accompanying translational blurring, and is thus smaller than the gravitational acceleration.

The smallest output among the fourth, fifth, and sixth sensor outputs of the acceleration sensor 150 acquired in the posture of the digital camera 1 shown in FIG. 14 corresponds to the acceleration in the X axis direction (horizontal direction) of the memory card 100 inserted into the digital camera 1.

In this manner, in the posture of the digital camera 1 shown in FIG. 13 and the posture of the digital camera 1 shown in FIG. 14, the relationship (direction of insertion of the memory card) between the camera coordinate system of the digital camera 1 and the card coordinate system of the memory card 100 inserted into the digital camera 1 is specified on the basis of the magnitudes of the fourth, fifth, and sixth sensor outputs. The fourth, fifth, and sixth sensor outputs indicate the accelerations in the directions of the respective axes which are obtained from the acceleration sensor 150 built into the memory card 100.

The determination unit 112 in the CPU 110 of the memory card 100 is able to determine the direction of insertion of the memory card 100 on the basis of the status information of the digital camera 1 and the fourth, fifth, and sixth sensor outputs of the acceleration sensor 150.

Figure 15:
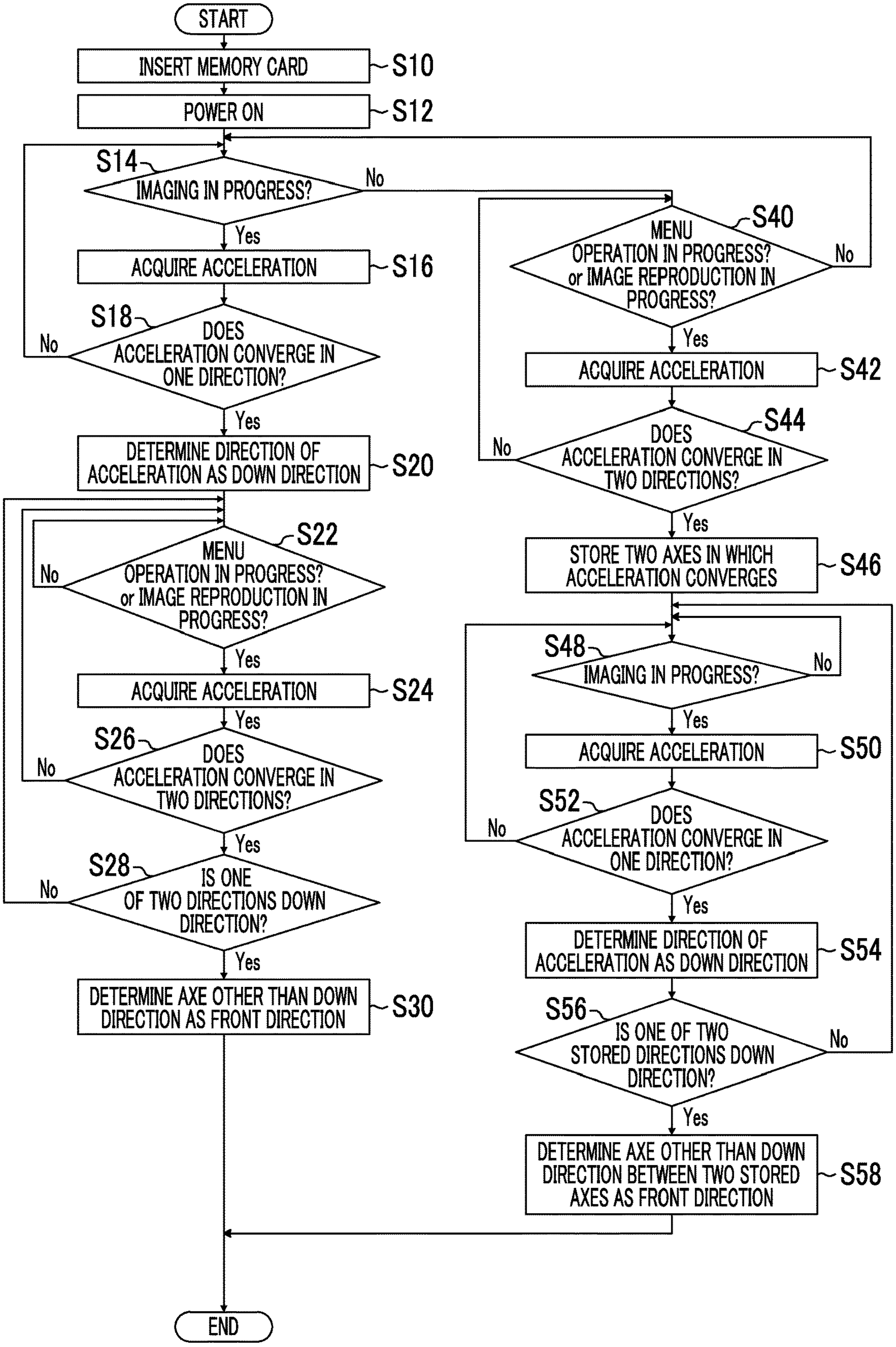
FIG. 15 is a flowchart showing processing of determining the direction of insertion of the memory card 100 according to a first determination method.

FIG. 15 is a flowchart showing the processing of determining the direction of insertion of the memory card 100 according to the first determination method.

In FIG. 15, in a case where the memory card 100 is inserted into the imaging device and the imaging device is turned on (steps S10 and S12), the determination unit 112 in the memory card 100 determines whether or not the imaging device is capturing a live view image or a moving image (step S14). In a case where the determination unit 112 is able to obtain the status information of the imaging device from the imaging device, it is possible to determine whether or not a live view image or a moving image is being captured on the basis the status information. However, even in a case where it is not possible to acquire the status information of the imaging device, the moving image data is recorded in the memory card 100 at least during capturing of the moving image. As a result, it is possible to determine whether the moving image is being captured.

In a case where it is determined that an image is being captured (in a case of "Yes" in step S14), the determination unit 112 acquires the accelerations (the fourth, fifth, and sixth sensor outputs) in the respective axis directions of the card coordinate system (xyz coordinate system) from the acceleration sensor 150 (step S16). The determination unit 112 determines whether or not one sensor output of the acquired fourth, fifth, and sixth sensor outputs is sufficiently larger than the other two sensor outputs (the acceleration converges in one direction) (step S18).

In a case where the acceleration converges in one direction (in a case of "Yes" in step S18), it is determined that the direction in which the acceleration converges in one direction is the down direction (gravitational acceleration direction) (step S20). One axis direction of the card coordinate system corresponding to one sensor output of the fourth, fifth, and sixth sensor outputs (the direction in which the acceleration converges in one direction) is set as the axis direction corresponding to the vertical axis direction (Y axis direction) of the camera coordinate system. In a case where the acceleration is not converged in one direction (in a case of "No"), the gravitational acceleration direction is unknown, and thus the processing returns to step S14.

In a case where the acceleration converges in one direction (in a case of "Yes" in step S18), next, the determination unit 112 displays a menu screen on the display unit 31 of the digital camera 1 to determine whether or not a menu operation is being performed or whether or not a moving image (video) recorded in the memory card 100 is being reproduced (step S22). In a case where the menu operation or video reproduction is being performed (in a case of "Yes" in step S22), the determination unit 112 acquires the accelerations (the fourth, fifth, and sixth sensor outputs) in the respective axis directions of the card coordinate system (xyz coordinate system) from the acceleration sensor 150 (step S24). The determination unit 112 determines whether or not two sensor outputs of the acquired fourth, fifth, and sixth sensor outputs are sufficiently larger than the other one sensor output (the acceleration converges in two directions) (step S26).

In a case where the acceleration converges in two directions (in a case of "Yes" in step S26), it is further determined whether or not one of the two directions is the down direction in step S20 (step S28). In a case where it is determined that one of the two directions is the down direction (in a case of "Yes" in step S28), the axis direction other than the down direction in the two directions is set as the axis direction corresponding to the front-rear axis direction (Z axis direction) of the camera coordinate system (step S30), and the remaining axis direction is set as the axis direction corresponding to the right-left axis direction (X axis direction) of the camera coordinate system.

In contrast, in a case where "No" is determined in step S28, the processing proceeds to step S22.

In a case where it is determined in step S14 that imaging is not being performed (in a case of "No" in step S14), the processing proceeds to step S40.

In step S40, as in step S22, it is determined whether or not the menu operation is being performed or whether or not the video reproduction is being performed. In a case where the menu operation or video reproduction is being performed (in a case of "Yes" in step S40), the determination unit 112 acquires the accelerations (the fourth, fifth, and sixth sensor outputs) in the respective axis directions of the card coordinate system (xyz coordinate system) from the acceleration sensor 150 (step S42). The determination unit 112 determines whether or not two sensor outputs of the acquired fourth, fifth, and sixth sensor outputs are sufficiently larger than the other one sensor output (the acceleration converges in two directions) (step S44).

Then, in a case where the acceleration converges in two directions (in a case of "Yes" in step S44), the determination unit 112 temporarily stores two axes of the card coordinate system corresponding to the two directions (step S46).

Next, as in step S14, the determination unit 112 determines whether or not imaging is being performed (step S48). In a case where it is determined that imaging is being performed (in a case of "Yes" in step S48), the determination unit 112 acquires accelerations (Fourth, fifth, and sixth sensor outputs) in the respective axis directions of the card coordinate system from the acceleration sensor 150 (step S50). Subsequently, the determination unit 112 determines whether or not one sensor output of the acquired fourth, fifth, and sixth sensor outputs is sufficiently larger than the other two sensor outputs (the acceleration converges in one direction) (step S52).

In a case where the acceleration converges in one direction (in a case of "Yes" in step S52), it is determined that the direction in which the acceleration converges in one direction is the down direction (gravitational acceleration direction) (step S54). One axis direction of the card coordinate system corresponding to one sensor output of the fourth, fifth, and sixth sensor outputs is set as the axis direction corresponding to the vertical axis direction (Y axis direction) of the camera coordinate system.

In a case where it is determined that one axis direction of the card coordinate system is the axis direction corresponding to the vertical axis direction (Y axis direction) of the camera coordinate system, it is determined whether or not one of axes in the two directions temporarily stored in step S46 is in the down direction determined in step S54 (step S56). Then, in a case where it is determined that one of the two directions is the down direction (in a case of "Yes" in step S56), the axis direction other than the down direction in the two directions is determined as the axis direction corresponding to the front-rear axis direction (Z axis direction) of the camera coordinate system (step S58), and the remaining axis direction is set as the axis direction corresponding to the right-left axis direction (X axis direction) of the camera coordinate system.

In contrast, in a case where "No" is determined in step S56, the processing proceeds to step S48.

<Second Determination Method>

The determination unit 112 in the CPU 110 of the memory card 100 shown in FIG. 3 acquires the device information of the imaging device and acquires the information about the direction of insertion of the memory card 100 through the network on the basis of the acquired device information.

The determination unit 112 may directly acquire the device information of the imaging device, into which the memory card 100 is inserted, from the imaging device or may acquire the device information of the imaging device, in which a moving image or a still image is captured, from the header information of a moving image file of the moving image data or a still image file of the still image data of the video data which is recorded in the memory card 100 by the imaging device.

The still image file is generally recorded as an image file in an exchangeable image file format (Exif). In the image file of the Exif file format, Exif information such as imaging date/time, model name, manufacturer, number of pixels, F number, and shutter speed are recorded as header information. Therefore, it is possible to acquire model information (device information) from the header information (Exif information) of the still image file. Incidentally, in the case where the header information of the moving image file contains the information of the model of the moving image, it is preferable to acquire the model information (device information) from the header information of the moving image file.

In a case of an environment where the determination unit 112 acquires the device information of the imaging device and the memory card 100 is able to access the service server that provides the retrieval site or the device information through the network (the Internet), the determination unit 112 retrieves information about the direction of insertion of the memory card 100 into the device on the basis of the acquired device information, or acquires information about the direction of insertion of the memory card 100 from the service server. Here, examples of the case of the environment where the memory card 100 is able to access a search site or the like on the Internet include: a case where the imaging device is the smartphone 5; a case where the memory card 100 is able to connect to the Internet through the carrier communication network of the smartphone 5; a case where the memory card 100 is inserted into a card slot of a personal computer or the like connected to the Internet; and the like.

<Third Determination Method>

An electronic compass 160 is built into the memory card 100 shown in FIG. 3. The electronic compass 160 includes a geomagnetic sensor that detects each of magnetic flux densities of the geomagnetism in the respective axis directions of the three orthogonal axes, and detects each of a magnetic flux density in the x axis direction, a magnetic flux density in the y axis direction, and a magnetic flux density in the z axis direction in the card coordinate system shown in FIG. 4, and outputs the geomagnetic data (sensor outputs) indicating the magnetic flux densities of the geomagnetism in the respective axis directions.

The determination unit 112 determines the direction of insertion of the memory card 100 on the basis of the sensor output indicating the magnetic flux density detected by the electronic compass 160.

For example, the imaging device is swung from the east to the north, and is stopped such that the front side of the imaging device faces the north (imaging direction is northward). In a case where the imaging device is swung as described above, the determination unit 112 acquires geomagnetic data (sensor outputs), which is detected by the electronic compass 160, in the respective axis directions of the card coordinate system from the electronic compass 160, and determines the direction of insertion of the memory card 100 inserted into the imaging device by analyzing the acquired sensor outputs.

In a case where the imaging device is swung from the east to the north, the sensor outputs in the two directions among the sensor outputs in the respective axis directions of the card coordinate system of the electronic compass 160 greatly fluctuate. It can be determined that the two directions in which the sensor outputs vary greatly correspond to the X axis direction and the Z axis direction of the camera coordinate system. Further, on the basis of the sensor output of the electronic compass 160 obtained in a case where the imaging direction of the imaging device is stopped such that the imaging direction becomes the northward direction, it is possible to detect which direction of the two directions in which the sensor outputs greatly varies corresponds to the Z axis direction of the camera coordinate system. In the geomagnetic sensor, the magnetic flux density is detected as a vector quantity having a magnitude and a direction. Thus, it is possible to find a relationship (that is, the direction of insertion of the memory card 100 inserted into the imaging device) between the respective axis directions of the card coordinate system and the respective axis directions of the camera coordinate system, on the basis of the sensor outputs, which greatly vary, in the two directions and a condition where the imaging device is swung from the east to the north (the imaging device is yawed in the positive direction).

Further, in a case where the imaging device is swung from the east to the north, in addition to the sensor output of the electronic compass 160, by acquiring the first, second, and third sensor outputs detected by the gyro sensor 140, the first, second, and third sensor outputs detected by the gyro sensor 140 may be used for determining the direction of insertion of the memory card 100 inserted into the imaging device.

In a case where the direction of insertion of the memory card 100 is determined, guidance may be intentionally given to swing the imaging device, or processing may be automatically performed in a case where the swing is detected.

Further, in a case where the imaging device comprises the electronic compass and is able to acquire sensor output indicating the azimuth direction of the imaging device from the electronic compass, the determination unit 112 determines the direction of insertion of the memory card 100 by matching the first, second, and third sensor outputs detected by the gyro sensor 140 with the sensor outputs indicating the azimuth directions of the imaging device which is acquired in a case where the imaging device is swung.

That is, from the sensor output indicating the azimuth direction of the imaging device acquired in a case where the imaging device is yawed, it is possible to determine the sensor output corresponding to the angular velocity in the direction of rotation about the Y axis of the imaging device among the first, second, and third sensor outputs detected by the gyro sensor 140. Further, it is possible to determine the sensor outputs corresponding to the angular velocities in the direction of rotation about the X axis and the direction of rotation about the Z axis of the imaging device on the basis of the determination result and the first, second, and third sensor outputs of the gyro sensor 140 in a case where the imaging device is subjected to pitching or rolling, for example.

<Fourth Determination Method>

The blur correction unit 114 shown in FIG. 3 corrects blurring of the moving image recorded in the flash memory 130 on the basis of the first, second, and third sensor outputs of the gyro sensor 140 recorded together with the moving image. Further, in a state where the direction of insertion of the memory card 100 is unknown, the blur correction is performed by using the first, second, and third sensor outputs of the gyro sensor 140. Thus, the direction of insertion of the memory card 100 is assumed, and blur correction is performed using the first, second, and third sensor outputs corresponding to the assumed direction of insertion.

For example, in a case where it is assumed that the direction of insertion of the memory card 100 is the direction of insertion shown in FIG. 7, the blur correction unit 114 applies the first, second, and third sensor outputs of the gyro sensor 140 as acceleration data about accelerations in the direction of rotation about the X axis, the direction of rotation about the Y axis and the direction of rotation about the Z axis of the camera coordinate system, and performs blur correction.

The determination unit 112 calculates an amount of blurring of the moving image in which the blur correction unit 114 corrects blurring, through the image processing, and determines, as the direction of insertion of the memory card 100 into the imaging device, the assumed direction of insertion in a case where the blurring of the moving image corrected by the blur correction unit 114 is minimized on the basis of the assumed direction of insertion.

Further, the blur correction unit 114 does not need to reproduce a moving image. For example, the blur correction unit 114 may correct blurring (amounts of deviation) of the two images on the basis of two images at different times in the moving image and the first, second, and third sensor outputs of the gyro sensor detected to correspond to the two images.

Figure 16:
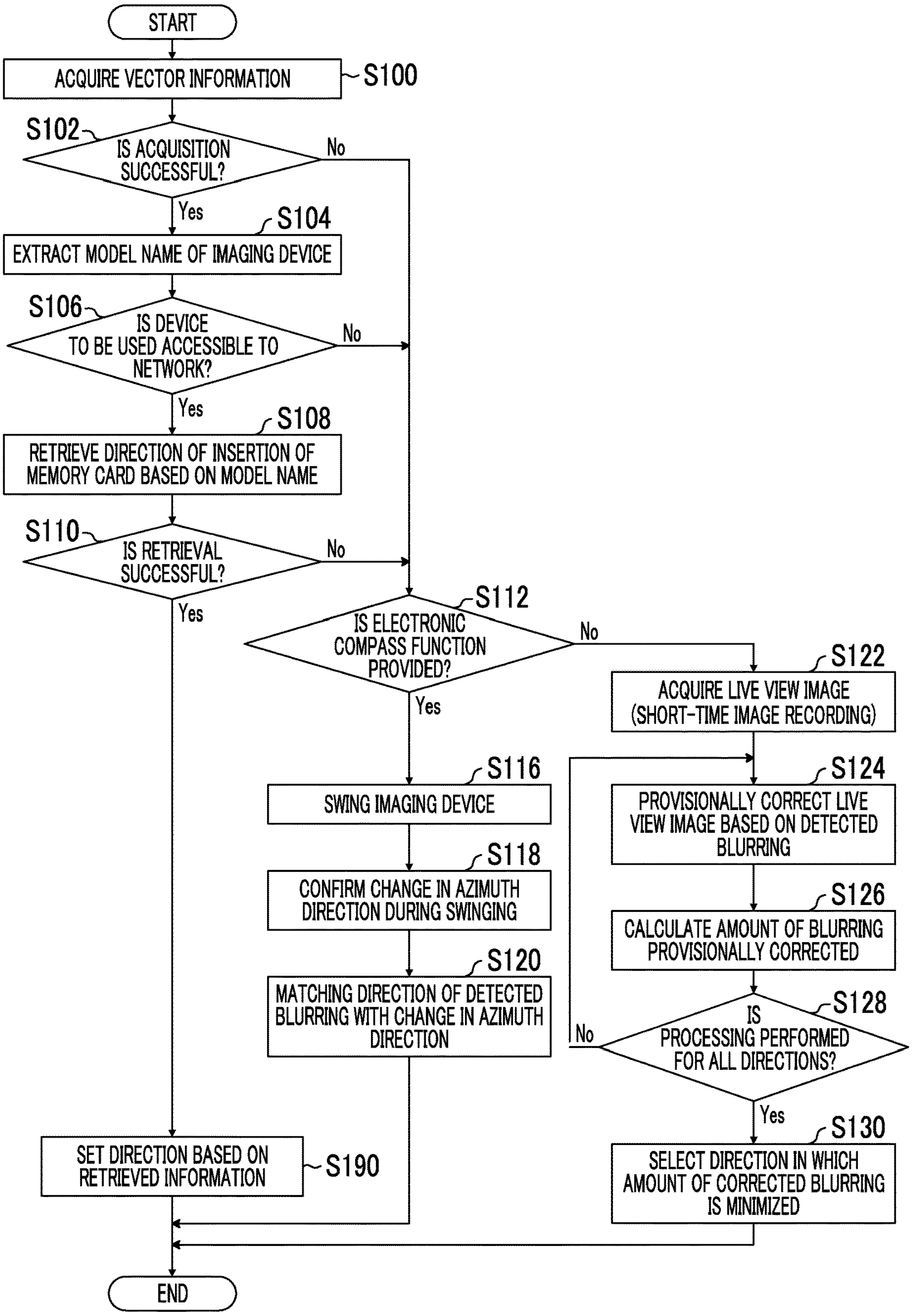
FIG. 16 is a flowchart showing processing of determining the direction of insertion of the memory card 100 according to the second to fourth determination methods.

FIG. 16 is a flowchart showing processing of determining the direction of insertion of the memory card 100 according to the second to fourth determination methods.

In FIG. 16, the determination unit 112 acquires header information which is header information of the moving image file recorded in the flash memory 130 and in which a model name and the like of the imaging device are recorded (step S100). In a case where the model name of the imaging device is not recorded as the header information, the header information (Exif tag information) of the still image file recorded together with the moving image file may be acquired. The reason for this is that the model name and the like of the imaging device are recorded in the Exif tag information.

Subsequently, it is determined whether or not the desired header information is successfully acquired (step S102). In a case of successful acquisition (in a case of "Yes" in step S102), the model name of the imaging device is extracted from the header information (step S104).

In a case where the model name of the imaging device is extracted, it is determined whether or not the device to be used can be connected to the Internet (step S106). The case where the device to be used can be connected to the Internet includes not only a case where the imaging device can be connected to the Internet but also a case where the memory card 100 can be connected to the Internet through a personal computer or the like.

In a case where it is determined in step S106 that the device to be used can be connected to the Internet (in a case of "Yes" in step S106), the direction of insertion of the memory card 100 into the imaging device is retrieved through the Internet on the basis of the model name of the imaging device (step S108). In a case where the retrieval is successful (step S110), the direction of insertion of the memory card 100 into the imaging device is set on the basis of the retrieved information (step S190).

In contrast, in a case where it is determined in step S102 that valid header information can not be acquired, it is determined whether or not the imaging device has an electronic compass function (step S112). In a case where it is determined that the imaging device has an electronic compass function (in a case of "Yes" in step S112), for example, the imaging device is swung in the yawing direction and the pitching direction (step S116). The change in the azimuth direction during the swing of the imaging device in the yawing direction is confirmed (step S118). The direction of insertion of the memory card 100 into the imaging device is determined on the basis of the matching between the change in the azimuth direction and the changes in the first, second, and third sensor outputs of the gyro sensor 140 (step S120).

In a case where it is determined in step S112 that there is no electronic compass function, the processing proceeds to step S122. In step S122, the live view image and the sensor outputs of the gyro sensor 140 are acquired, and the short-time live view image and the sensor outputs are temporarily stored in the flash memory 130 (or the RAM 116).

The blur correction unit 114 assumes one direction out of all possible directions as the direction of insertion of the memory card 100 and provisionally corrects blurring of the live view image on the basis of the stored live view image and the sensor outputs of the gyro sensor 140 corresponding to the assumed direction of insertion (step S124). The determination unit 112 calculates the amount of blurring of the live view image provisionally corrected (step S126).

Subsequently, it is determined whether or not the processing in steps S124 and S126 has been performed for all directions in the direction of insertion (step S128). In a case where the processing in steps S124 and S126 is executed in all directions in the direction of insertion (in a case of "Yes" in step S128), a direction in which the amount of corrected blurring calculated in step S126 is minimized is selected as the direction of insertion of the memory card 100 into the imaging device (step S130).

[Recording Method of Sensor Output]

Figure 17:
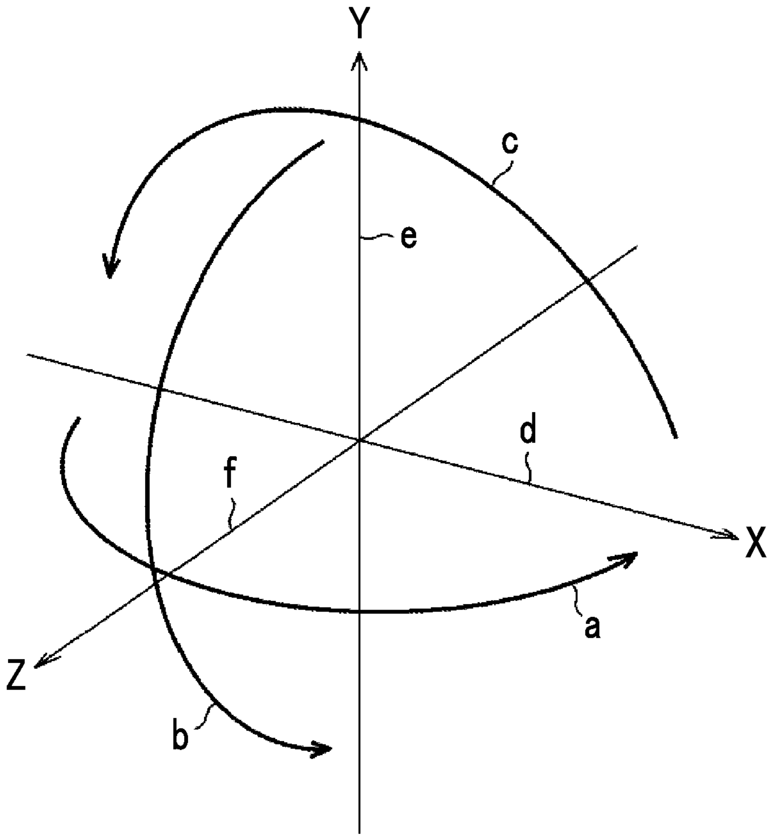
FIG. 17 is a diagram showing a relationship between the camera coordinate system (XYZ coordinate system), the angular velocity in the direction of rotation about each axis of the camera coordinate system, and the acceleration in each axis direction.

FIG. 17 is a diagram showing a relationship between the camera coordinate system (XYZ coordinate system), the angular velocity in the direction of rotation about each axis of the camera coordinate system, and the acceleration in each axis direction. Further, the camera coordinate system is as defined in FIG. 5.

As shown in FIG. 17, the angular velocity in the direction of rotation about the Y axis (yaw direction) in the camera coordinate system is a, the angular velocity in the direction of rotation about the X axis (pitch direction) is b, the angular velocity in the direction of rotation about the Z axis (roll direction) is c, the acceleration in the X axis direction is d, the acceleration in the Y axis direction is e, and the acceleration in the Z axis direction is f.

Figure 18:
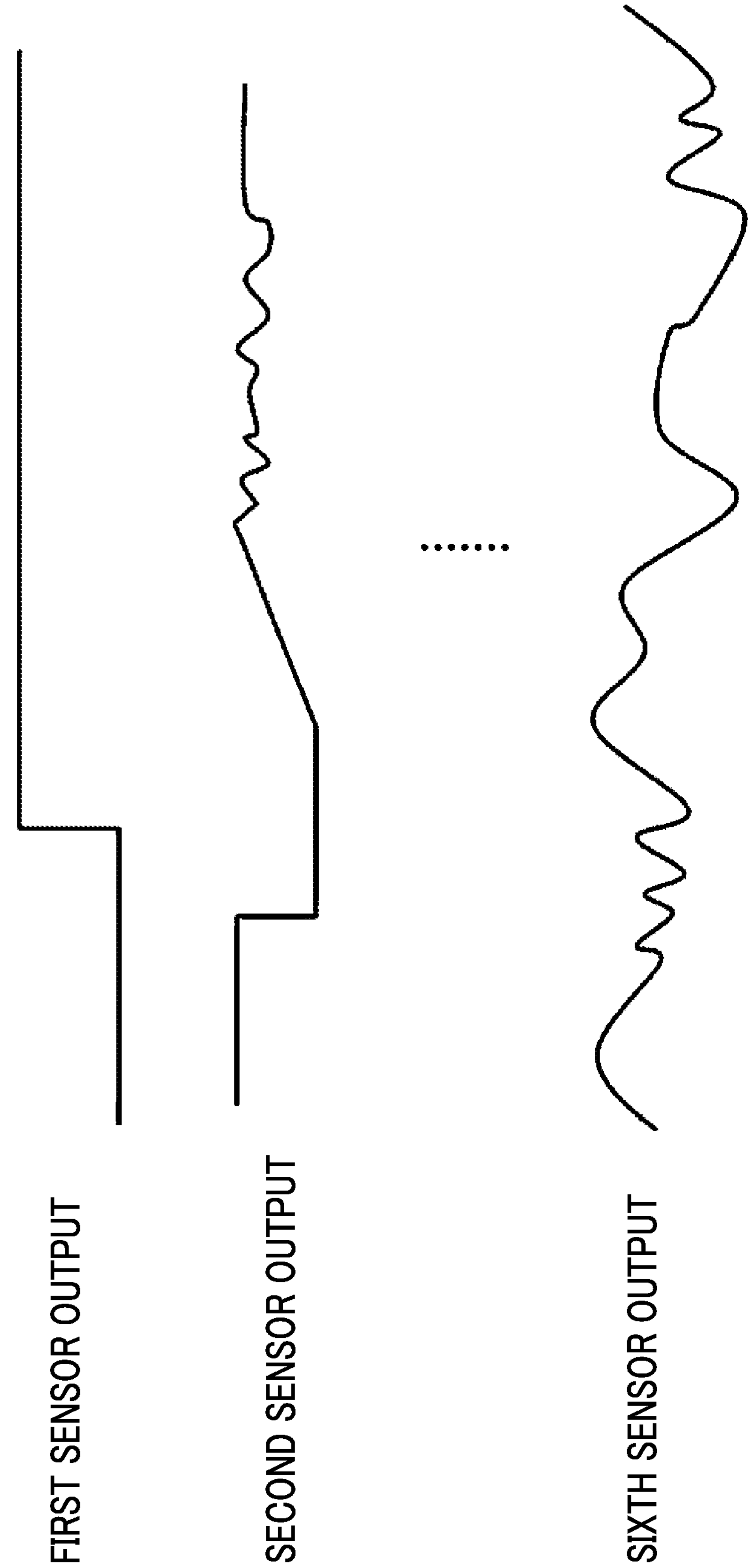
FIG. 18 is a waveform chart showing sensor outputs of a gyro sensor 140 and an acceleration sensor 150.

FIG. 18 is a waveform chart showing the sensor outputs of the gyro sensor 140 and an acceleration sensor 150.

The first, second, and third sensor outputs of the gyro sensor 140 shown in FIG. 18 are angular velocity data indicating the angular velocities in the directions of rotation about the respective axes of the card coordinate system (the xyz coordinate system defined in FIG. 4). The fourth, fifth, and sixth sensor outputs of the acceleration sensor 150 are acceleration data indicating accelerations in the respective axis directions of the card coordinate system.

<First Recording Method of Sensor Output>

In a case where the direction of insertion of the memory card 100 into the imaging device is determined, it is possible to find the correspondence relationship between the camera coordinate system and the card coordinate system (refer to FIG. 12). As a result, it is possible to find the correspondence relationship between the angular velocities a, b, and c in the directions of rotation about the respective axes of the camera coordinate system and the first, second, and third sensor outputs of the gyro sensor 140. Similarly, it is possible to find the correspondence relationship between the accelerations d, e, and f in the directions of rotation about the respective axes of the camera coordinate system and the fourth, fifth, and sixth sensor outputs of the acceleration sensor 150.

Figure 19:
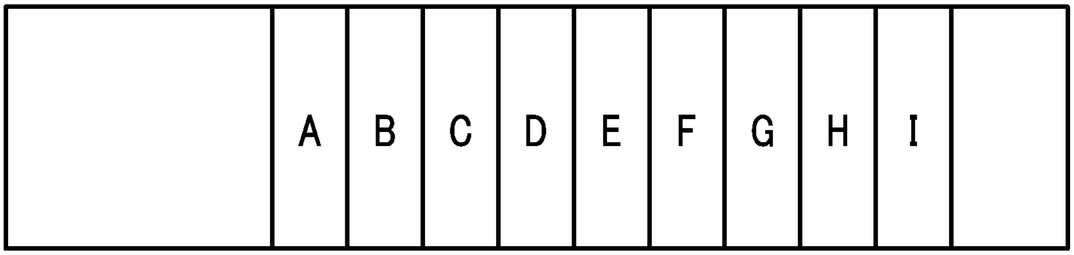
FIG. 19 is a diagram showing data areas of a flash memory 130 used for explaining a first recording method of recording the sensor outputs.

FIG. 19 is a diagram showing a data area of the flash memory 130.

In FIG. 19, the data areas A, B, and C of the flash memory 130 are respectively set as areas for recording the angular velocities a, b, and c in the directions (the yaw direction, the pitch direction, and the roll direction) of rotation about the respective axes of the camera coordinate system. The data areas D, E, and F are respectively set as areas for recording the accelerations d, e, and f in the respective axis directions (the right-left direction, the up-down direction, and the front-rear direction) of the camera coordinate system.

A first recording unit constituted by the CPU 110 and the memory I/F 122 records a moving image file, which indicates a moving image captured by the imaging device, in the flash memory 130.

Further, a second recording unit constituted by the CPU 110 and the memory I/F 122 detects which of the first, second, and third sensor outputs of the gyro sensor 140 is angular velocities in the yaw direction, the pitch direction, and the roll direction on the basis of the determination result of the direction of insertion of the memory card 100. Therefore, the first, second, and third sensor outputs are recorded in the corresponding areas of the data areas A, B, and C of the flash memory 130, respectively.

Likewise, on the basis of the determination result of the direction of insertion of the memory card 100, it is possible to detect which of the fourth, fifth, and sixth sensor outputs of the acceleration sensor 150 is the accelerations in the right-left direction, the up-down direction, and the front-rear direction. Therefore, the fourth, fifth, and sixth sensor outputs are recorded in corresponding areas of the data areas D, E and F of the flash memory 130, respectively.

The data format for storing the sensor output may be stored in a text file or stored in a binary format.

In addition, the time code indicating the passage of time from the start of imaging the moving image is recorded in the moving image file together with the moving image data. Therefore, it is preferable to record the first to sixth sensor outputs according to the same time code.

<Second Recording Method of Sensor Output>

Figure 20:
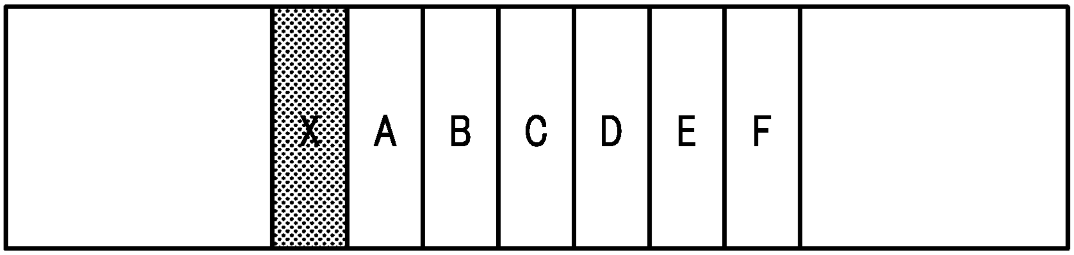
FIG. 20 is a diagram showing data areas of a flash memory 130 used for explaining a second recording method of recording the sensor outputs.

FIG. 20 is a diagram showing a data area of the flash memory 130.

In FIG. 20, the data areas A, B, and C of the flash memory 130 are set as areas for recording the first, second, and third sensor outputs detected by the gyro sensor 140, respectively. The data areas D, E, and F are set as areas for recording the fourth, fifth, and sixth sensor outputs detected by the acceleration sensor 150, respectively.

Further, the data area X of the flash memory 130 shown in FIG. 20 is set as an area for recording information indicating the direction of insertion of the memory card 100 into the imaging device.

A first recording unit constituted by the CPU 110, the memory I/F 122, and the flash memory 130 records a moving image file, which indicates the moving image captured by the imaging device, in the flash memory 130.

The second recording unit constituted by the CPU 110, the memory I/F 122, and the flash memory 130 records each of the first, second, and third sensor outputs of the gyro sensor 140 in the data areas A, B, and C of the flash memory 130, and records each of the fourth, fifth, and sixth sensor outputs of the acceleration sensor 150 in the data areas D, E, and F.

Further, the third recording unit constituted by the CPU 110, the memory I/F 122, and the flash memory 130 records information, which indicates the direction of insertion of the memory card 100 into the imaging device, in the data area X of the flash memory 130. The information indicating the direction of insertion of the memory card 100 may be any information as long as it is possible to specify the correspondence relationship between the camera coordinate system and the card coordinate system by using the information.

On the basis of the determination result of the direction of insertion of the memory card 100, it is possible to detect which of the first, second, and third sensor outputs of the gyro sensor 140 is the angular velocities in the yaw direction, the pitch direction, and the roll direction of the imaging device. Similarly, it is possible to detect which of the fourth, fifth, and sixth sensor outputs of the acceleration sensor 150 is the accelerations in the right-left direction, the up-down direction, and the front-rear direction of the imaging device. Therefore, the third recording unit may record information (address) indicating which area of the data areas A, B, and C of the flash memory 130 each of the angular velocities in the yaw direction, the pitch direction, and the roll direction of the imaging device is recorded in. In addition, the third recording unit may record information (address) indicating which area of the data areas D, E, and F of the flash memory 130 each of the accelerations in the right-left direction, the up-down direction, and the front-rear direction of the imaging device is recorded in.

[Moving Image Reproduction Device]

The digital camera 1 shown in FIGS. 5 and 6 also functions as a moving image reproduction device according to the present invention.

The digital camera 1 is able to reproduce a still image or a moving image recorded in the memory card 100 by selecting a playback mode through an operation of the operation unit 21 or the like. Further, in a case of reproducing a moving image recorded in the memory card 100, a playback mode, in which blurring of the moving image is corrected and the moving image is reproduced, and a playback mode, in which blurring of the moving image is not corrected and the moving image is reproduced, can be selected through the operation of the operation unit 21 or the like. Hereinafter, a case of correcting blurring of the moving image recorded in the memory card 100 and reproducing the moving image will be described.

In the digital camera 1, in a case where the moving image file recorded in the memory card 100 is selected in the playback mode, the CPU 15 and the external memory controller 30 functioning as an information acquisition unit read the selected moving image file from the memory card 100, decompress the compressed moving image data of the read moving image file through the compression/decompression processing unit 27, and temporarily store the moving image file in the main memory 24. At the same time, the information acquisition unit acquires information about camera shake (the first, second, and third sensor outputs of the gyro sensor 140, and the fourth, fifth, and sixth sensor outputs of the acceleration sensor 150) recorded in the memory card 100 in association with the read moving image file and the information indicating the direction of insertion of the memory card 100, and temporarily stores the information in the main memory 24.

The digital signal processing unit 26 functioning as the blur correction unit first allocates the read first, second, and third sensor outputs of the gyro sensor 140 to the sensor outputs corresponding to the yaw direction, the pitch direction, and the roll direction of the read moving image, on the basis of the information indicating the direction of insertion of the memory card 100, and allocates the read fourth, fifth, and sixth sensor outputs of the acceleration sensor 150 to the sensor outputs corresponding to the right-left direction and the up-down direction of the read moving image.

The digital signal processing unit 26 corrects blurring (angular blurring) in the yaw direction, the pitch direction, and the roll direction of the moving image and blurring (translational blurring) in the right-left direction and the up-down direction of the moving image by using the allocated sensor outputs.

For example, in a case of correcting the angular blurring in the pitch direction, the sensor output (angular velocity) allocated to the pitch direction among the first, second, and third sensor outputs of the gyro sensor 140 is integrated, and the blur angle in the pitch direction is calculated. Based on the calculated blur angle and the focal length of the imaging lens 10 (for example, the focal length at the time of capturing a moving image recorded in the header portion of the moving image file is used), the number of pixels corresponding to the amount of blurring on the surface of the imaging element 11 in the up-down direction is calculated, and the frames constituting the moving image by the calculated number of pixels are shifted. Thereby, the angular blurring in the pitch direction is corrected.

Further, in the case of correcting translational blurring in the up-down direction, the sensor output (acceleration) allocated to the up-down direction among the fourth, fifth, and sixth sensor outputs of the acceleration sensor 150 is integrated, and translational blurring in the up-down direction is calculated. Based on the calculated translational blurring, the focal length of the imaging lens 10, and the subject distance (for example, the focal length and the subject distance at the time of capturing the moving image recorded in the header portion of the moving image file is used), the number of pixels corresponding to the amount of translational blurring on the surface of the imaging element 11 in the up-down direction is calculated, and the frames constituting the moving image by the calculated number of pixels are shifted. Thereby, the translational blurring in the up-down direction is corrected.

The video signal, which indicates the moving image in which angular blurring and translational blurring are corrected in such a manner, is output to the display unit 31 through the display controller 32 (output unit) and reproduced as a moving image. Alternatively, the video signal is output to an external display such as a liquid crystal television through a video output terminal (output unit), which is not shown, and reproduced as a moving image.

In the smartphone 5 shown in FIG. 11, a moving image may be horizontally captured and a moving image may be vertically captured. Thus, the smartphone 5 stores information, which indicates the rotation direction of the smartphone 5 (electronic device) at the time of capturing a moving image, in the header portion of the moving image file. The information indicating the rotation direction means, for example, information indicating the rotation position of the horizontal imaging, the rotation position of the vertical imaging rotated clockwise by 90° from the horizontal imaging state, or the rotation position of the vertical imaging rotated counterclockwise by 90°. In the case of the smartphone 5 shown in FIG. 11, the information indicating the rotation direction is information indicating the rotation position of the vertical imaging by the smartphone 5 shown in FIG. 11, the rotation position of the horizontal imaging rotated clockwise by 90° from this rotation position, and the rotation position of the horizontal imaging rotated counterclockwise by 90°.

In a case of reproducing a moving image captured by the imaging device such as the smartphone 5, the moving image reproduction device acquires information indicating the direction of rotation of the imaging device at the time of capturing the moving image. The blur correction unit allocates the sensor outputs of the gyro sensor 140 and the acceleration sensor 150 to sensor outputs corresponding to the yaw direction, the pitch direction, and the roll direction of the moving image and sensor outputs corresponding to the right-left direction and the up-down direction of the moving image, on the basis of the information indicating the direction of rotation of the imaging device in addition to the information indicating the direction of insertion of the memory card 100. Then, the blur correction unit corrects angular blurring in the yaw direction, the pitch direction and the roll direction of the moving image and translational blurring in the right-left direction and the up-down direction of the moving image by using the allocated sensor outputs.

In the smartphone 5 shown in FIG. 11, a moving image may be captured by the self-imaging imaging unit 7. Thus, the smartphone 5 records information of the imaging unit in the header portion of the moving image file. The information indicates which imaging unit among the imaging units provided on the front and rear sides of the smartphone 5 (electronic device) is the imaging unit at the time of capturing the moving image.

The moving image reproduction device may reproduce a moving image, and may acquire information, which indicates that the imaging unit at the time of capturing the moving image is the imaging unit for self-imaging, from the header portion of the moving image file. In this case, the blur correction unit allocates the sensor outputs of the gyro sensor 140 and the acceleration sensor 150 to sensor outputs indicating angular velocities corresponding to the yaw direction, the pitch direction, and the roll direction of the moving image and sensor outputs indicating accelerations corresponding to the right-left direction and the up-down direction of the moving image, on the basis of the information indicating the direction of insertion of the memory card 100 and the information of the imaging unit for self-imaging. Then, the blur correction unit corrects angular blurring in the yaw direction, the pitch direction and the roll direction of the moving image and translational blurring in the right-left direction and the up-down direction of the moving image by using the allocated sensor outputs.

[Others]

The digital camera 1 shown in FIG. 6 has a camera shake correcting function. Thus, in a case where the ON mode for camera shake is selected at the time of capturing a moving image and the moving image in which camera shake is corrected is captured, it is preferable that the memory card does not record information about camera shake.

The memory card 100 of the present embodiment comprises the gyro sensor 140, the acceleration sensor 150, and the electronic compass 160. However, the memory card according to the present invention may comprise at least a gyro sensor. In a case where the acceleration sensor is not provided, information about the angular velocity is not recorded in the memory card, and it is not possible to correct translational blurring of the moving image. However, in a normal moving image, translational blurring is small with respect to angular blurring. Thus, even in the memory card in which the acceleration sensor is not provided, it is possible to reproduce a moving image in which blurring rarely occurs.

Further, the determination unit of the present embodiment has a determination function of determining the direction of insertion of the memory card into the imaging device by using a plurality of determination methods. However, the present invention is not limited to this, and the determination unit may have a determination mechanism that determines the direction of insertion by using one or more determination methods.

Further, the imaging device comprises the moving image reproduction device which corrects blurring of a moving image recorded in the memory card by using information about camera shake and reproduces the moving image. The present invention is not limited to this. It is needless to say that, for example, an imaging function of a personal computer or the like may be not provided.

Furthermore, the memory card according to the present invention is not limited to those having the same appearance as the SD card of this embodiment, but can be applied to memory cards having various appearances.

The present invention is not limited to the above-mentioned embodiments, and it goes without saying that various modifications are possible without departing from the spirit of the present invention.

EXPLANATION OF REFERENCES

1 to 4: digital camera
5: smartphone
6: display input unit
7: imaging unit
10: imaging lens
11: imaging element
12: stop
14: infrared cut filter
15, 110: CPU

18: lens driving unit
19: stop driving unit
20: imaging element driving unit
21: operation unit
22: analog signal processing unit
23: A/D converter
24: main memory
25: memory controller
26: digital signal processing unit
27: compression/decompression processing unit
28: integration unit
30: external memory controller
31: display unit
32: display controller
33: control bus
34: data bus
41: correction lens
42: blur correction mechanism
50: blur controller
52: camera shake detection unit
100: memory card
102: write-protect switch
104: terminal
112: determination unit
114: blur correction unit
116: RAM
118: ROM
120: card I/F
122: memory I/F
124: internal bus
130: flash memory
140: gyro sensor
150: acceleration sensor
160: electronic compass
S10 to S30, S40 to S58, S100 to S130: steps

What is claimed is:

1. A memory card attachable to and detachable from an electronic device having an imaging sensor for capturing at least a moving image, the memory card comprising:

a gyro sensor that detects each of angular velocities in respective directions of axial rotation about three orthogonal axes;

a memory; and a processor configured to record the moving image captured by the electronic device in the memory;

record each of first, second, and third sensor outputs indicating the angular velocities in the directions of axial rotation about the three orthogonal axes, which are detected by the gyro sensor, in association with the moving image to be recorded in the memory;

determine a direction of insertion of the memory card, which is mounted on the electronic device, into the electronic device; and record information indicating the direction of insertion in association with the moving image to be recorded in the memory, the information specifying correspondence relationship between a coordinate system of the electronic device and a coordinate system of the memory card.

2. The memory card according to claim 1, further comprising an acceleration sensor that detects each of accelerations in respective axis directions of the three orthogonal axes, wherein the processor is further configured to record each of the fourth, fifth, and sixth sensor outputs indicating the accelerations in the respective axis directions of the three orthogonal axes, which are detected by the acceleration sensor, in association with the moving image to be recorded in the memory.

3. The memory card according to claim 2, wherein the processor is further configured to determine the direction of insertion on the basis of the fourth, fifth, and sixth sensor outputs obtained from the acceleration sensor in a case where the electronic device captures the moving image and the fourth, fifth, and sixth sensor outputs obtained from the acceleration sensor in a case of using a display provided on a rear side of the electronic device.

4. The memory card according to claim 3, wherein the processor is further configured to acquire information about the direction of insertion through a network on the basis of device information of the electronic device.

5. The memory card according to claim 2, wherein the processor is further configured to acquire information about the direction of insertion through a network on the basis of device information of the electronic device.

6. The memory card according to claim 2, further comprising an electronic compass, wherein the processor is further configured to determine the direction of insertion on the basis of a sensor output indicating a magnetic flux density detected by the electronic compass or on the basis of a sensor output indicating a magnetic flux density detected by the electronic compass and the first, second, and third sensor outputs detected by the gyro sensor.

7. The memory card according to claim 1, wherein the processor is further configured to acquired information about the direction of insertion through a network on the basis of device information of the electronic device.

8. The memory card according to claim 1, further comprising an electronic compass, wherein the processor is further configured to determine the direction of insertion on the basis of a sensor output indicating a magnetic flux density detected by the electronic compass or on the basis of a sensor output indicating a magnetic flux density detected by the electronic compass and the first, second, and third sensor outputs detected by the gyro sensor.

9. The memory card according to claim 1, wherein the electronic device includes an electronic compass, and wherein the processor is further configured to determine the direction of insertion on the basis of a sensor output indicating an azimuth direction detected by the electronic compass and the first, second, and third sensor outputs detected by the gyro sensor.

10. The memory card according to claim 1, wherein the processor is further configured to correct blurring of the moving image on the basis of the moving image recorded in the memory and the first, second, and third sensor outputs recorded in the memory, and wherein the processor is further configured to assume the direction of insertion and determine, as the direction of insertion of the memory card into the electronic device, the assumed direction of insertion in a case where the corrected blurring of the moving image is minimized on the basis of the assumed direction of insertion.

11. A moving image reproduction device comprising:

a processor configured to acquire the moving image, the first, second, and third sensor outputs and information indicating the direction of insertion, from the memory card according to claim 1;

allocate the first, second, and third sensor outputs to sensor outputs corresponding to the yaw direction, the pitch direction, and the roll direction of the acquired moving image on the basis of the obtained information indicating the direction of insertion, and corrects blurring in the yaw direction, the pitch direction, and the roll direction of the moving image by using the respective sensor outputs; and output the moving image in which blurring is corrected.

12. The moving image reproduction device according to claim 11, wherein the processor is further configured to acquire information indicating a rotation direction of the electronic device in a case of capturing the moving image, and wherein the processor is further configured to allocate the first, second, and third sensor outputs to sensor outputs corresponding to the yaw direction, the pitch direction, and the roll direction of the acquired moving image on the basis of the acquired information indicating the direction of insertion and the information indicating the rotation direction, and corrects blurring of the moving image in the yaw direction, the pitch direction, and the roll direction by using the allocated sensor outputs.

13. The moving image reproduction device according to claim 11, wherein the processor is further configured to acquire information of an imaging unit that captures the moving image among imaging units provided on a front side and a rear side of the electronic device, and wherein the processor is further configured to allocate the first, second, and third sensor outputs to sensor outputs corresponding to the yaw direction, the pitch direction, and the roll direction of the acquired moving image on the basis of the acquired information indicating the direction of insertion and the information of the imaging unit, and corrects blurring of the moving image in the yaw direction, the pitch direction, and the roll direction by using the allocated sensor outputs.

14. A memory card attachable to and detachable from an electronic device having an imaging sensor for capturing at least a moving image, the memory card comprising:

a gyro sensor that detects each of angular velocities in respective directions of axial rotation about three orthogonal axes;

a memory; and a processor configured to record the moving image captured by the electronic device in the memory;

record each of first, second, and third sensor outputs indicating the angular velocities in the directions of axial rotation about the three orthogonal axes, which are detected by the gyro sensor, in association with the moving image to be recorded in the memory;

determine a direction of insertion of the memory card, which is mounted on the electronic device, into the electronic device; and record each of the first, second, and third sensor outputs in data areas allocated for a yaw direction, a pitch direction, and a roll direction in association with the moving image to be recorded in the memory, on the basis of information indicating the direction of insertion, the information specifying correspondence relationship between a coordinate system of the electronic device and a coordinate system of the memory card.

15. The memory card according to claim 14, further comprising an acceleration sensor that detects each of accelerations in respective axis directions of the three orthogonal axes, wherein the processor is further configured to record each of fourth, fifth, and sixth sensor outputs indicating the accelerations in the respective axis directions of the three orthogonal axes, which are detected by the acceleration sensor on the basis of the direction of insertion, in data areas allocated for a right-left direction, an up-down direction and a front-rear direction of the moving image.

16. The memory card according to claim 15, wherein the processor is further configured to determine the direction of insertion on the basis of the fourth, fifth, and sixth sensor outputs obtained from the acceleration sensor in a case where the electronic device captures the moving image and the fourth, fifth, and sixth sensor outputs obtained from the acceleration sensor in a case of using a display provided on a rear side of the electronic device.

17. The memory card according to claim 16, wherein the processor is further configured to acquire information about the direction of insertion through a network on the basis of device information of the electronic device.

18. The memory card according to claim 15, wherein the processor is further configured to acquire information about the direction of insertion through a network on the basis of device information of the electronic device.

19. The memory card according to claim 14, wherein the processor is further configured to acquire information about the direction of insertion through a network on the basis of device information of the electronic device.

20. The memory card according to claim 14, further comprising an electronic compass, wherein the processor is further configured to determine the direction of insertion on the basis of a sensor output indicating a magnetic flux density detected by the electronic compass or on the basis of a sensor output indicating a magnetic flux density detected by the electronic compass and the first, second, and third sensor outputs detected by the gyro sensor.

* * * * *